United States Patent
Fenton et al.

(10) Patent No.: US 10,232,561 B2
(45) Date of Patent: Mar. 19, 2019

(54) MATERIALS, METHODS AND DEVICES FOR JOINING LINES

(71) Applicant: OC10, LLC, Jamaica Plain, MA (US)

(72) Inventors: Paul V. Fenton, Marblehead, MA (US); Kevin L. Ohashi, Jamaica Plain, MA (US)

(*) Notice: Subject to any disclaimer, the term of this patent is extended or adjusted under 35 U.S.C. 154(b) by 321 days.

(21) Appl. No.: 14/031,005

(22) Filed: Sep. 18, 2013

(65) Prior Publication Data
US 2014/0097554 A1 Apr. 10, 2014

Related U.S. Application Data

(60) Provisional application No. 61/744,079, filed on Sep. 18, 2012.

(51) Int. Cl.
*A01K 91/04* (2006.01)
*B29C 65/70* (2006.01)
(Continued)

(52) U.S. Cl.
CPC .............. *B29C 65/70* (2013.01); *A01K 91/04* (2013.01); *A01K 91/047* (2013.01);
(Continued)

(58) Field of Classification Search
CPC ..... B29C 65/70; B29C 66/83; B29C 66/8322; B29C 66/861; B29C 66/8614;
(Continued)

(56) References Cited

U.S. PATENT DOCUMENTS

| 893,173 A | 7/1908 | Kunze |
| 2,449,349 A | 9/1948 | Waugh et al. |

(Continued)

FOREIGN PATENT DOCUMENTS

| EP | 1270485 | 1/2003 |
| FR | 1320382 | 3/1963 |

(Continued)

OTHER PUBLICATIONS

Machine translation of abstract of JP57029441A.*
Machine translation of specification of JP57029441.*

*Primary Examiner* — Philip C Tucker
*Assistant Examiner* — Jimmy R Smith, Jr.
(74) *Attorney, Agent, or Firm* — Pandiscio & Pandiscio

(57) ABSTRACT

A hand-held device for joining fishing line segments of monofilament, fluorocarbon, and/or braid lines of similar or differing sizes or combinations or securing hooks or other components to at least one line. The device includes an encasement for orienting the fishing line segments in a closed chamber in close, non-contacting orientation. A material is injected into the closed chamber to encase the lines. This material can be adhesive material or a flowable polymer material having a melting temperature lower than the line segments to be bonded. A pre-formed, flexible polymer sheath is used to retain the line segments in the chamber. A heater heats the polymer sheath within the encasement to allow the polymer to flow and encase the line segments without melting the line segments. Bonding of the line segments can be achieved without melting, abrading, compressing, or impairing the integrity the line segment(s) to be encased.

19 Claims, 37 Drawing Sheets

(51) Int. Cl.

| | | |
|---|---|---|
| B29C 65/00 | (2006.01) | |
| A01K 91/047 | (2006.01) | |
| B29C 65/18 | (2006.01) | |
| B29C 65/48 | (2006.01) | |
| B29C 65/54 | (2006.01) | |
| B29C 65/56 | (2006.01) | |
| B29C 45/03 | (2006.01) | |
| B29C 45/14 | (2006.01) | |
| B65H 69/02 | (2006.01) | |
| B65H 69/08 | (2006.01) | |
| F16G 11/02 | (2006.01) | |
| F16G 11/04 | (2006.01) | |
| F16G 11/14 | (2006.01) | |
| B29L 31/00 | (2006.01) | |
| B29C 65/30 | (2006.01) | |
| F16G 11/00 | (2006.01) | |

(52) U.S. Cl.
CPC ...... *B29C 45/036* (2013.01); *B29C 45/14491* (2013.01); *B29C 65/18* (2013.01); *B29C 65/483* (2013.01); *B29C 65/4815* (2013.01); *B29C 65/4845* (2013.01); *B29C 65/542* (2013.01); *B29C 65/568* (2013.01); *B29C 66/69* (2013.01); *B29C 66/83* (2013.01); *B29C 66/861* (2013.01); *B29C 66/8614* (2013.01); *B65H 69/02* (2013.01); *B65H 69/08* (2013.01); *F16G 11/02* (2013.01); *F16G 11/042* (2013.01); *F16G 11/14* (2013.01); *B29C 65/305* (2013.01); *B29C 66/532* (2013.01); *B29C 66/71* (2013.01); *B29C 66/8322* (2013.01); *B29L 2031/7002* (2013.01); *B65H 2701/355* (2013.01); *F16G 11/00* (2013.01)

(58) Field of Classification Search
CPC ....... B29C 65/542; B29C 65/00; B29C 65/18; B29C 66/69; B29C 66/8324; A01K 91/04; A01K 91/047; A01K 91/03; B29L 2031/7002; B65H 69/08; B65H 2402/414; B65H 2701/355
See application file for complete search history.

(56) References Cited

U.S. PATENT DOCUMENTS

| | | | |
|---|---|---|---|
| 2,995,159 A * | 8/1961 | Berggren | B05C 17/0053 141/311 R |
| 3,284,257 A | 11/1966 | Soloff et al. | |
| 3,419,924 A | 1/1969 | Archibald | |
| 3,512,223 A | 5/1970 | Willinger | |
| 3,608,034 A | 9/1971 | Bramley et al. | |
| 3,629,541 A | 12/1971 | Mims et al. | |
| 3,970,735 A * | 7/1976 | Nelson | B29C 45/14549 264/263 |
| 4,011,869 A | 3/1977 | Seller, Jr. | |
| 4,700,818 A | 10/1987 | Orwin | |
| 5,084,058 A | 1/1992 | Li | |
| 5,133,723 A | 7/1992 | Li et al. | |
| 5,150,539 A | 9/1992 | Sorola | |
| 5,288,359 A * | 2/1994 | Stobbie, IV | B05C 17/00 156/294 |
| 5,507,760 A | 4/1996 | Wynne et al. | |
| 5,656,126 A | 8/1997 | Martinez | |
| 5,660,317 A | 8/1997 | Singer et al. | |
| 5,752,964 A | 5/1998 | Mericle | |
| 5,983,555 A | 11/1999 | Biel | |
| 6,038,806 A | 3/2000 | Maitland | |
| 6,086,806 A * | 7/2000 | Weatherall | B29C 65/18 156/304.5 |
| D440,294 S | 4/2001 | Bilek | |
| D453,332 S | 2/2002 | Herath | |
| 6,382,496 B1 | 5/2002 | Harger | |
| D466,150 S | 11/2002 | Matsumoto et al. | |
| D466,918 S | 12/2002 | Shiozaki et al. | |
| 6,508,030 B1 | 1/2003 | Sovik | |
| D477,357 S | 7/2003 | Nakajima et al. | |
| 6,703,750 B2 | 3/2004 | Nakamura | |
| 6,789,724 B2 | 9/2004 | Cordier et al. | |
| 6,793,750 B2 | 9/2004 | Bittar | |
| D500,836 S | 1/2005 | Nishi et al. | |
| D501,459 S | 2/2005 | Sarich et al. | |
| 6,884,249 B2 | 4/2005 | May et al. | |
| D581,988 S | 12/2008 | Hall et al. | |
| D592,732 S | 5/2009 | Sneddon et al. | |
| D616,491 S | 5/2010 | Yomoda et al. | |
| D636,017 S | 4/2011 | Takiguchi et al. | |
| D636,477 S | 4/2011 | Anderson et al. | |
| 7,938,847 B2 | 5/2011 | Fanton et al. | |
| 8,074,864 B2 * | 12/2011 | Lofton | B22D 19/04 164/53 |
| 8,109,945 B2 | 2/2012 | Boehlke | |
| 8,365,460 B2 | 2/2013 | Brown | |
| D697,131 S | 1/2014 | Hasui et al. | |
| D705,287 S | 5/2014 | Schmid et al. | |
| 8,714,409 B2 | 5/2014 | Muller-Paul | |
| D707,819 S | 6/2014 | Nalagatla et al. | |
| D711,502 S | 8/2014 | Savoy et al. | |
| D712,356 S | 9/2014 | Windom | |
| D712,507 S | 9/2014 | Hammerback | |
| D714,863 S | 10/2014 | Borkovec et al. | |
| D715,355 S | 10/2014 | Otsubo et al. | |
| D716,909 S | 11/2014 | Hammarback | |
| D723,462 S | 3/2015 | Druker et al. | |
| D723,653 S | 3/2015 | Peterson | |
| D725,470 S | 3/2015 | Wilcox et al. | |
| D731,204 S | 6/2015 | Watson et al. | |
| D733,871 S | 7/2015 | Wilcox et al. | |
| D737,518 S | 8/2015 | Yiu | |
| D742,550 S | 11/2015 | Mitchell | |
| D749,382 S | 2/2016 | Matsuoka et al. | |
| D752,732 S | 3/2016 | Ansley et al. | |
| D755,344 S | 5/2016 | Reckin et al. | |
| D762,812 S | 8/2016 | Branscomb et al. | |
| D767,822 S | 9/2016 | Jordan et al. | |
| D780,887 S | 3/2017 | Huda et al. | |
| D781,376 S | 3/2017 | Hakukawa et al. | |
| D782,259 S | 3/2017 | Rahm et al. | |
| D796,574 S | 9/2017 | Kamoshida et al. | |
| 2002/0187076 A1 | 12/2002 | DiCesare et al. | |
| 2003/0000621 A1 * | 1/2003 | Bittar | A01K 91/03 156/73.2 |
| 2003/0120287 A1 | 6/2003 | Gross et al. | |
| 2004/0254598 A1 | 12/2004 | Schumacher et al. | |
| 2007/0031183 A1 | 2/2007 | Sim | |
| 2009/0155516 A1 * | 6/2009 | Kobayashi | C08F 222/1006 428/65.1 |
| 2009/0228026 A1 | 9/2009 | Koogle, Jr. et al. | |
| 2009/0315214 A1 * | 12/2009 | Heikkila | C08K 3/08 264/299 |
| 2010/0153061 A1 | 6/2010 | Hietmann et al. | |
| 2010/0159197 A1 | 6/2010 | Ferguson et al. | |
| 2011/0238113 A1 | 9/2011 | Fanton et al. | |
| 2013/0010082 A1 | 1/2013 | Silverbrook | |
| 2013/0277393 A1 | 10/2013 | Rabin et al. | |
| 2014/0097554 A1 | 4/2014 | Fenton et al. | |
| 2014/0202060 A1 | 7/2014 | Ohashi et al. | |
| 2014/0291384 A1 | 10/2014 | Canelo | |
| 2014/0319104 A1 | 10/2014 | Kemmerer-Fleckenstein | |
| 2015/0367567 A1 | 12/2015 | Biehl et al. | |
| 2015/0373824 A1 | 12/2015 | Nettesheim et al. | |

FOREIGN PATENT DOCUMENTS

| | | |
|---|---|---|
| GB | 634286 | 3/1950 |
| GB | 2 449 297 | 11/2008 |
| JP | 57029441 A * | 2/1982 |

* cited by examiner

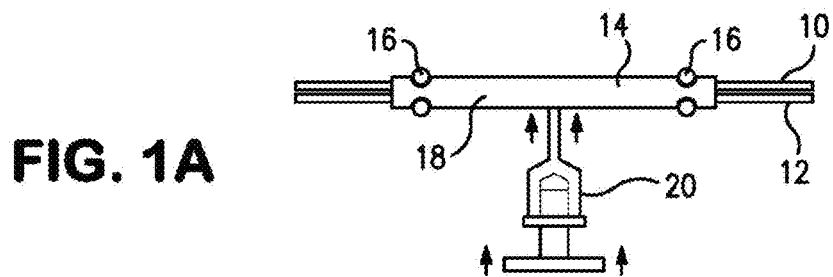
FIG. 1A
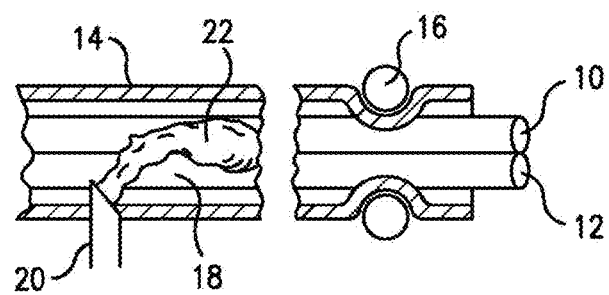
FIG. 1B
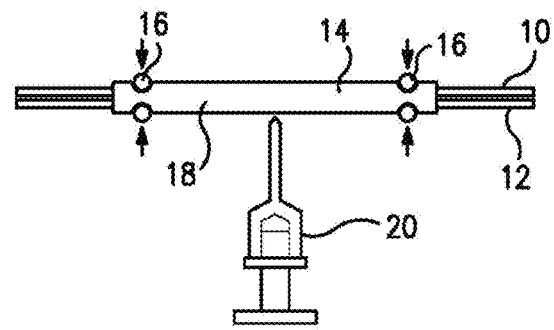
FIG. 1C
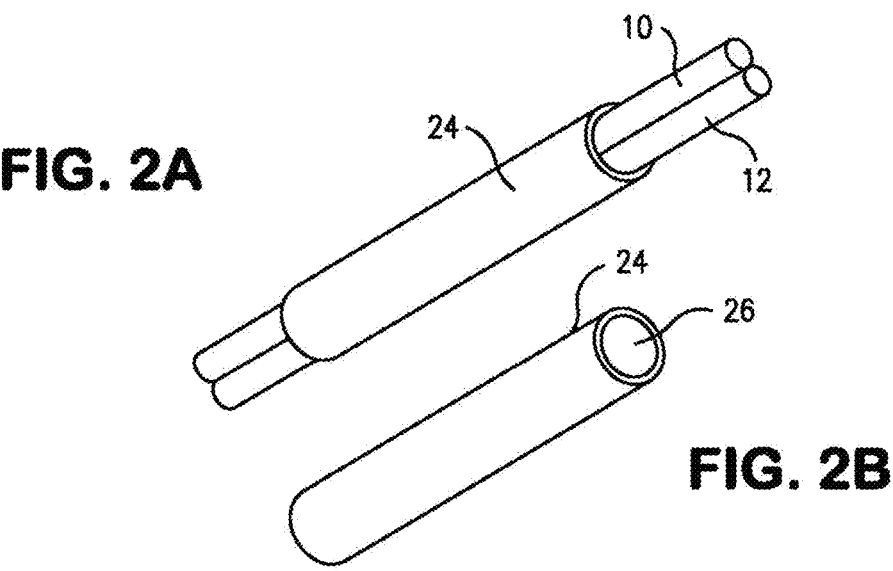
FIG. 2A
FIG. 2B

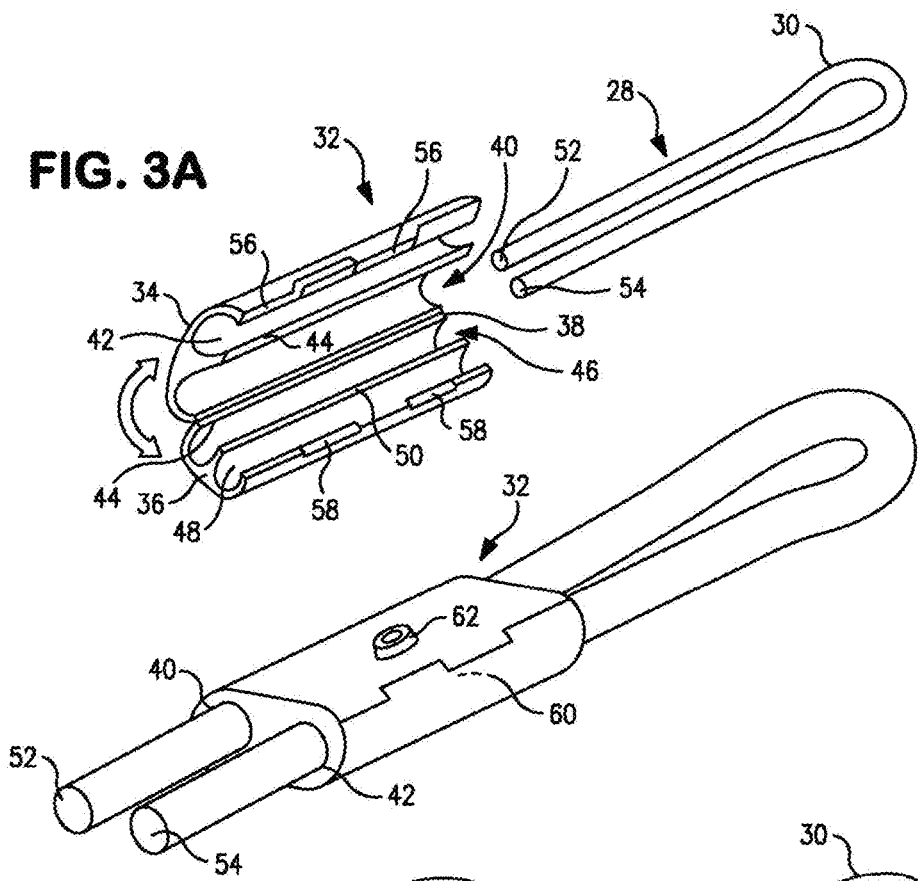
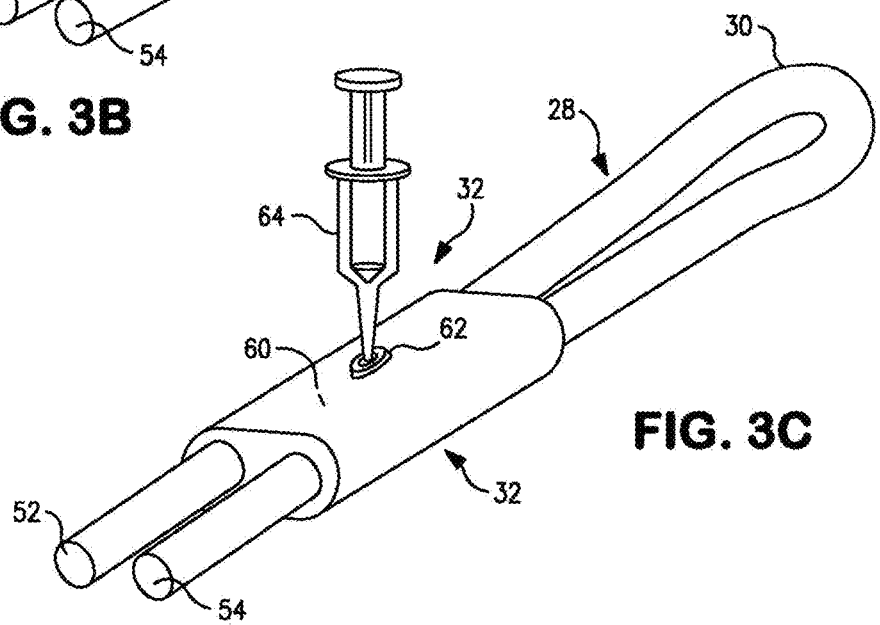

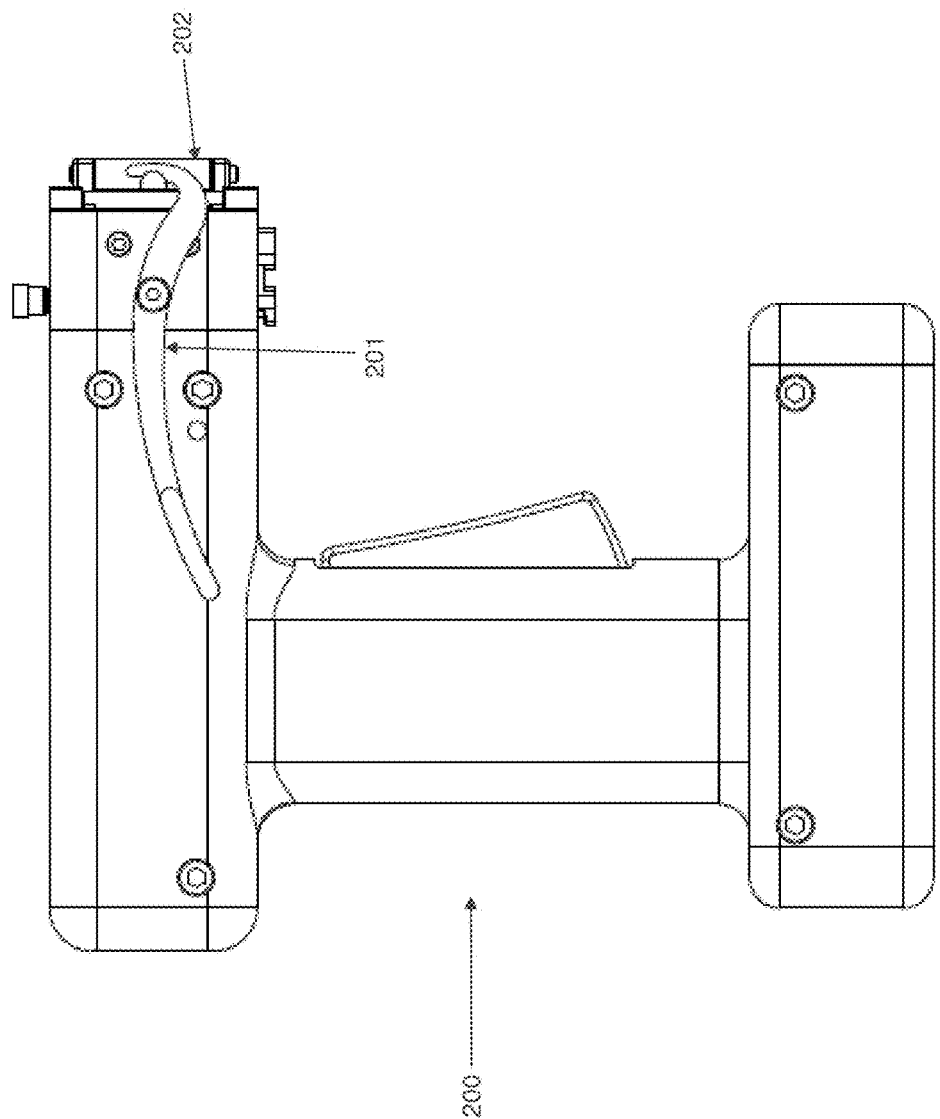

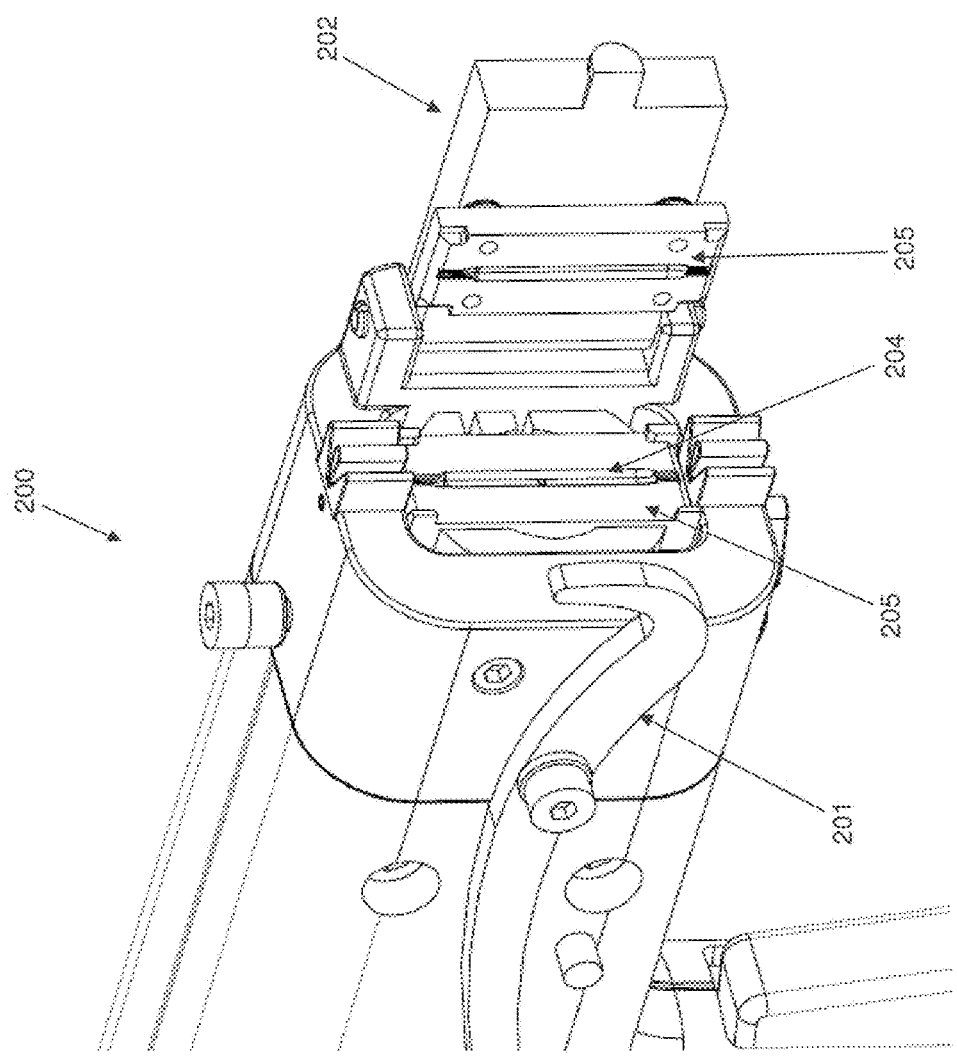

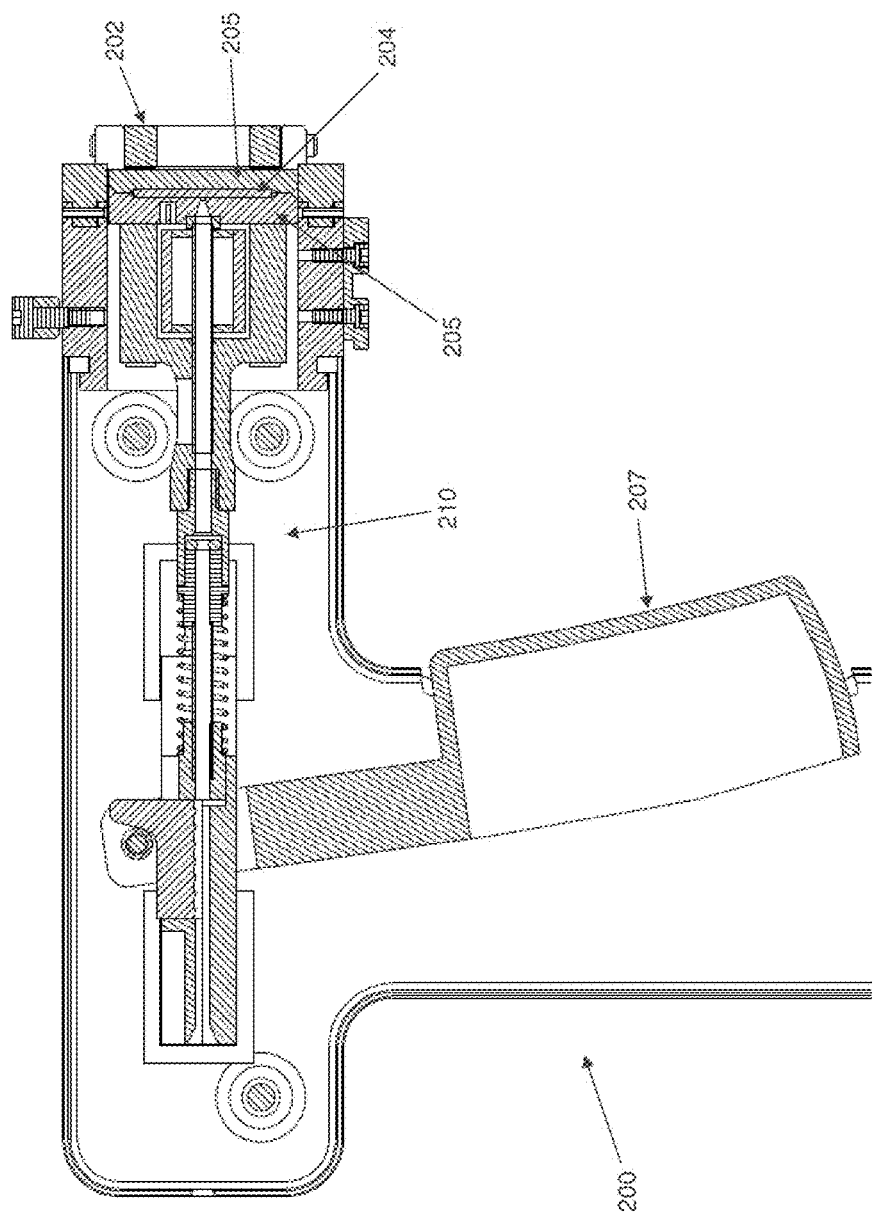

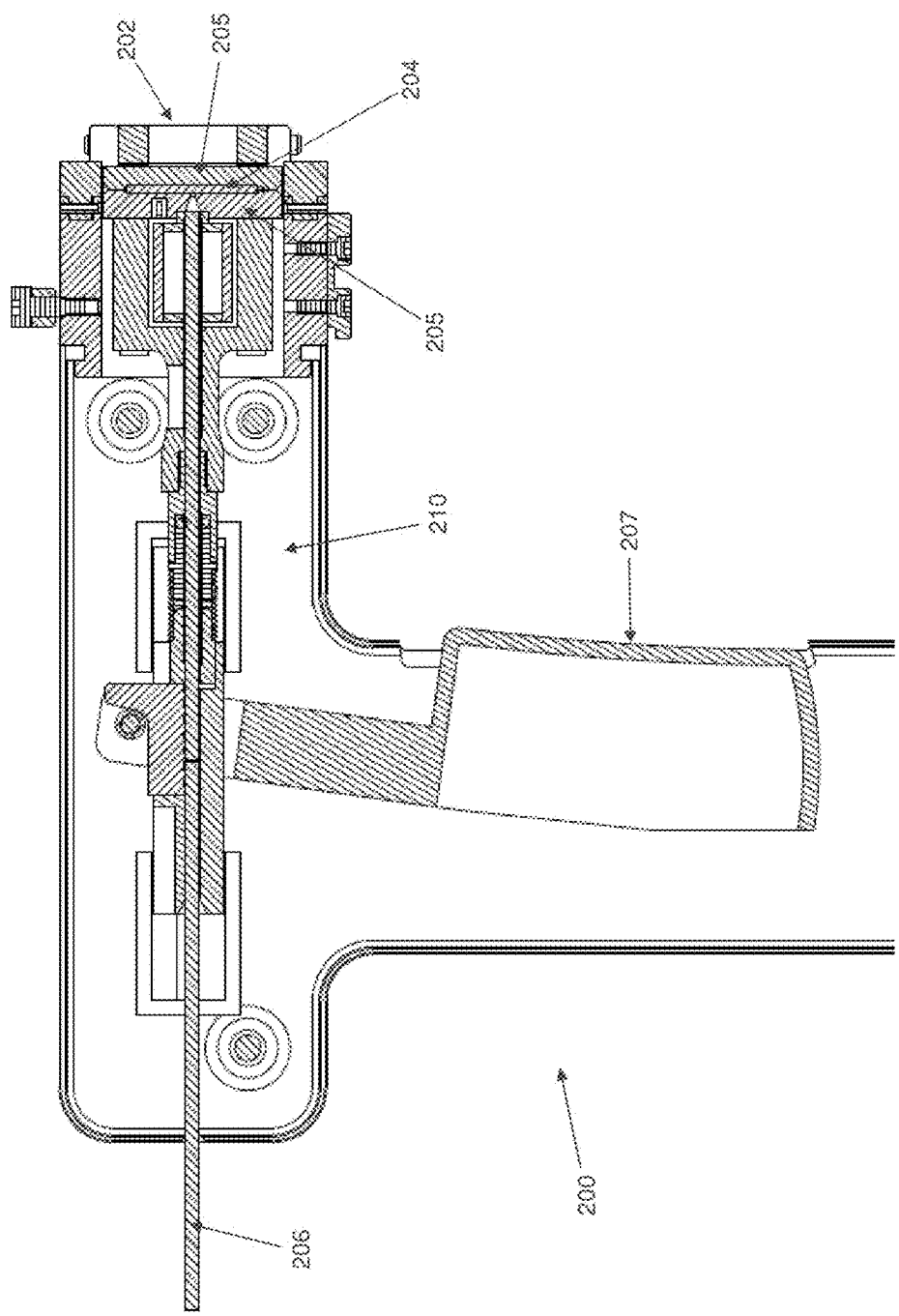

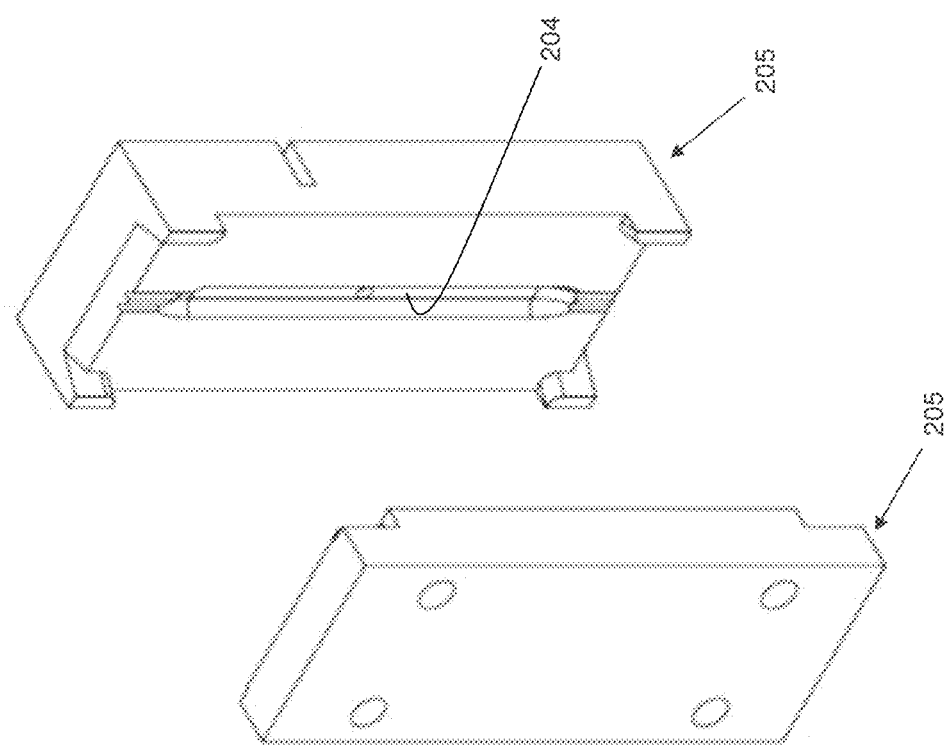

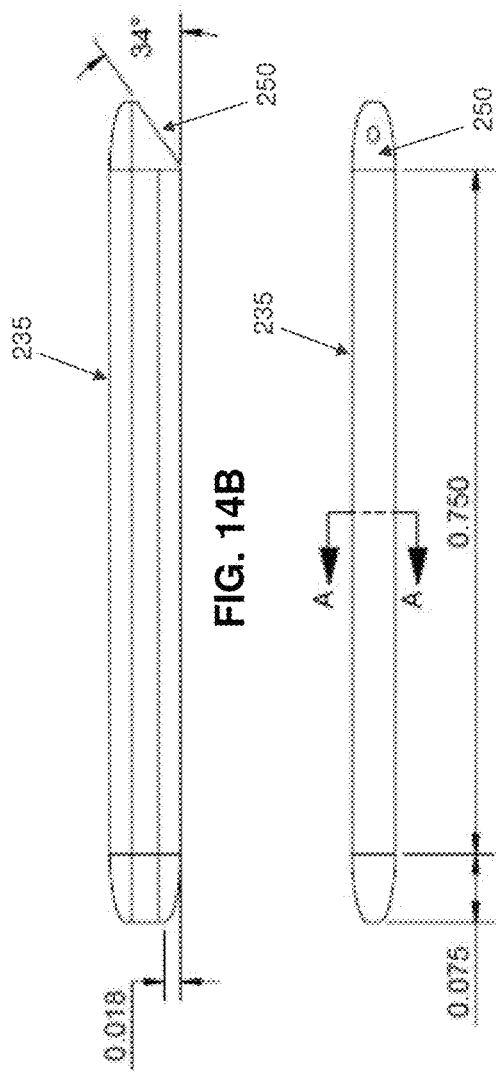
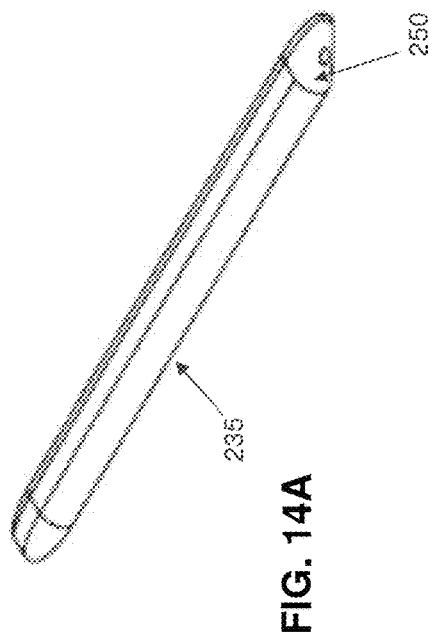
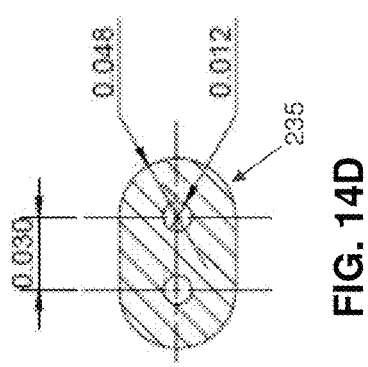
FIG. 14B
FIG. 14C
FIG. 14A
FIG. 14D

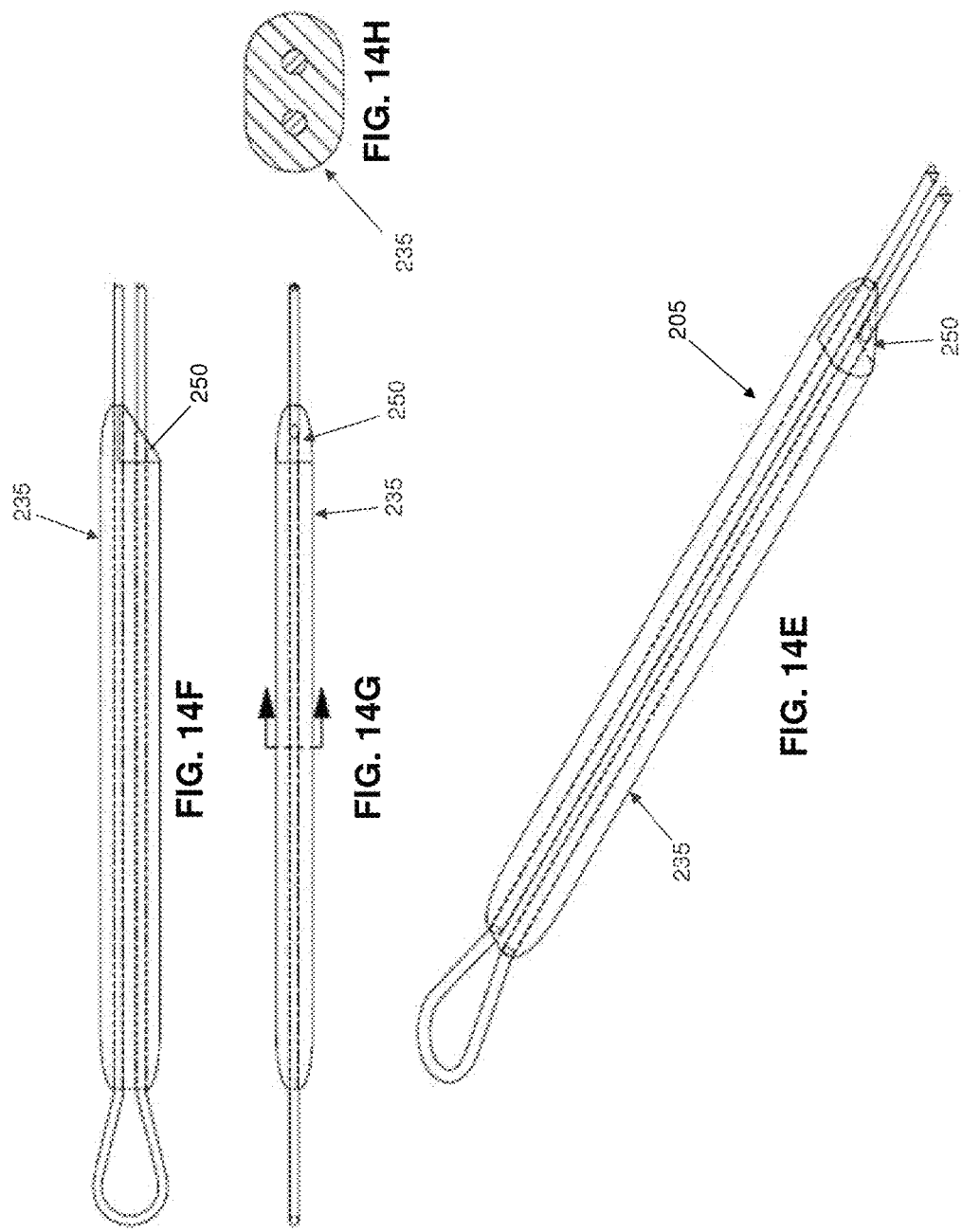

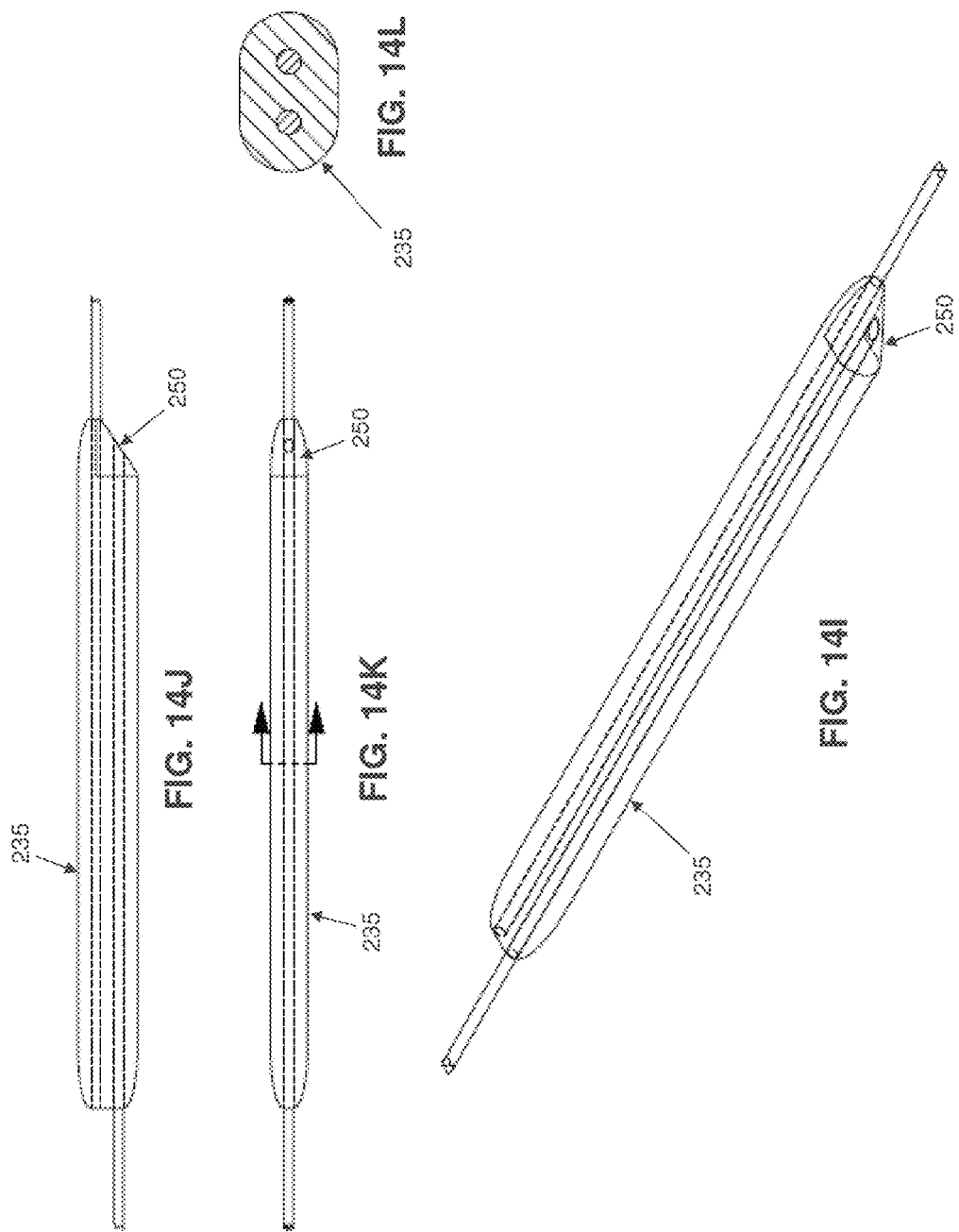

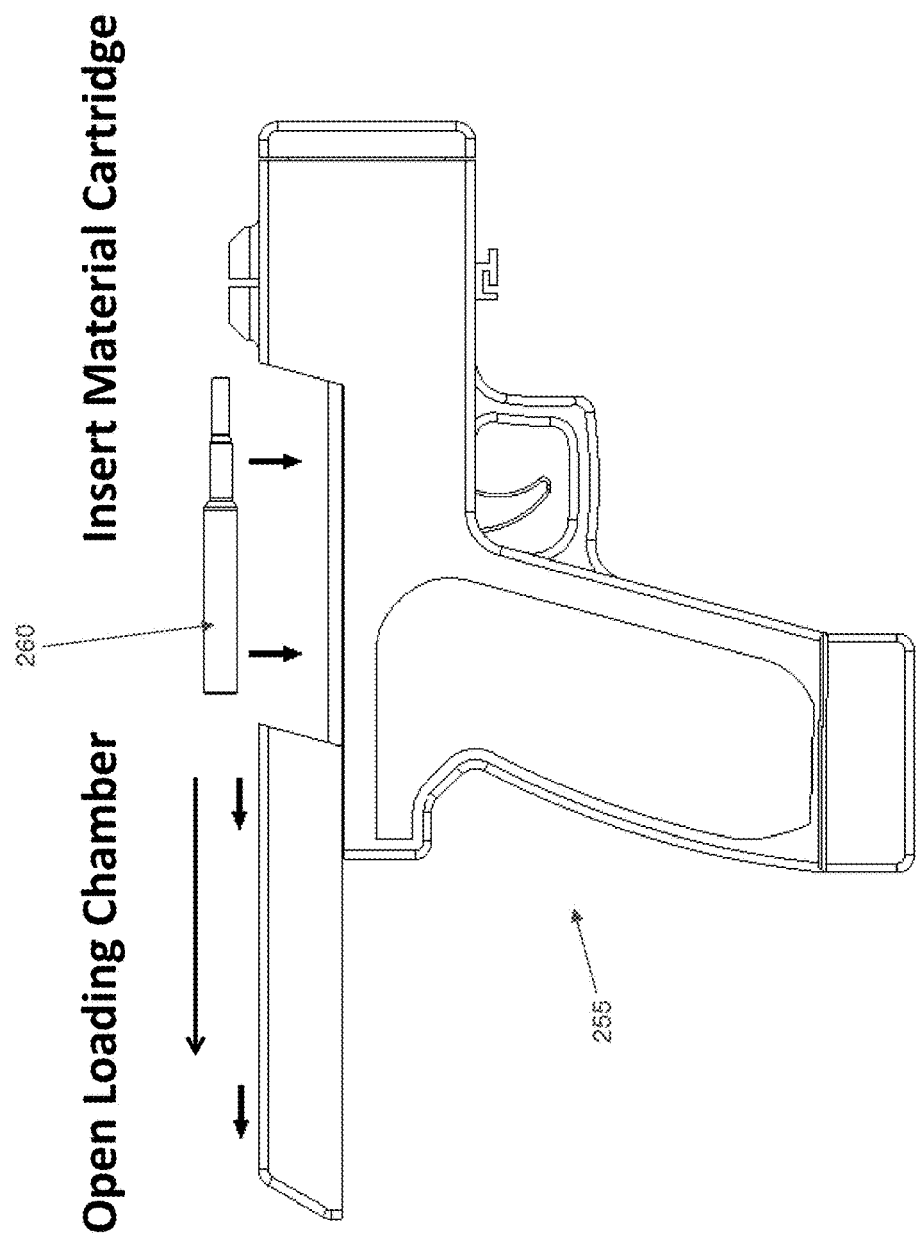

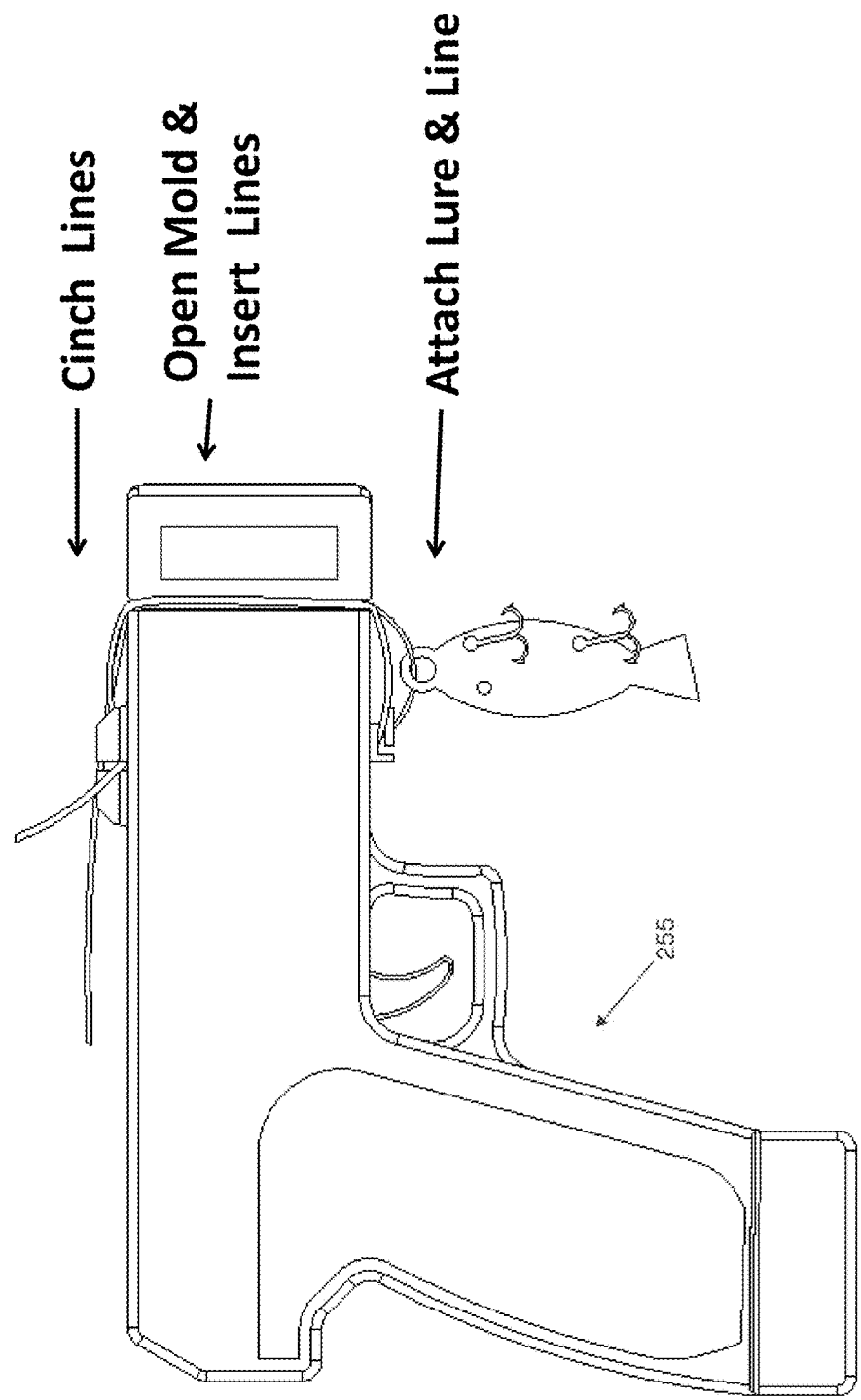

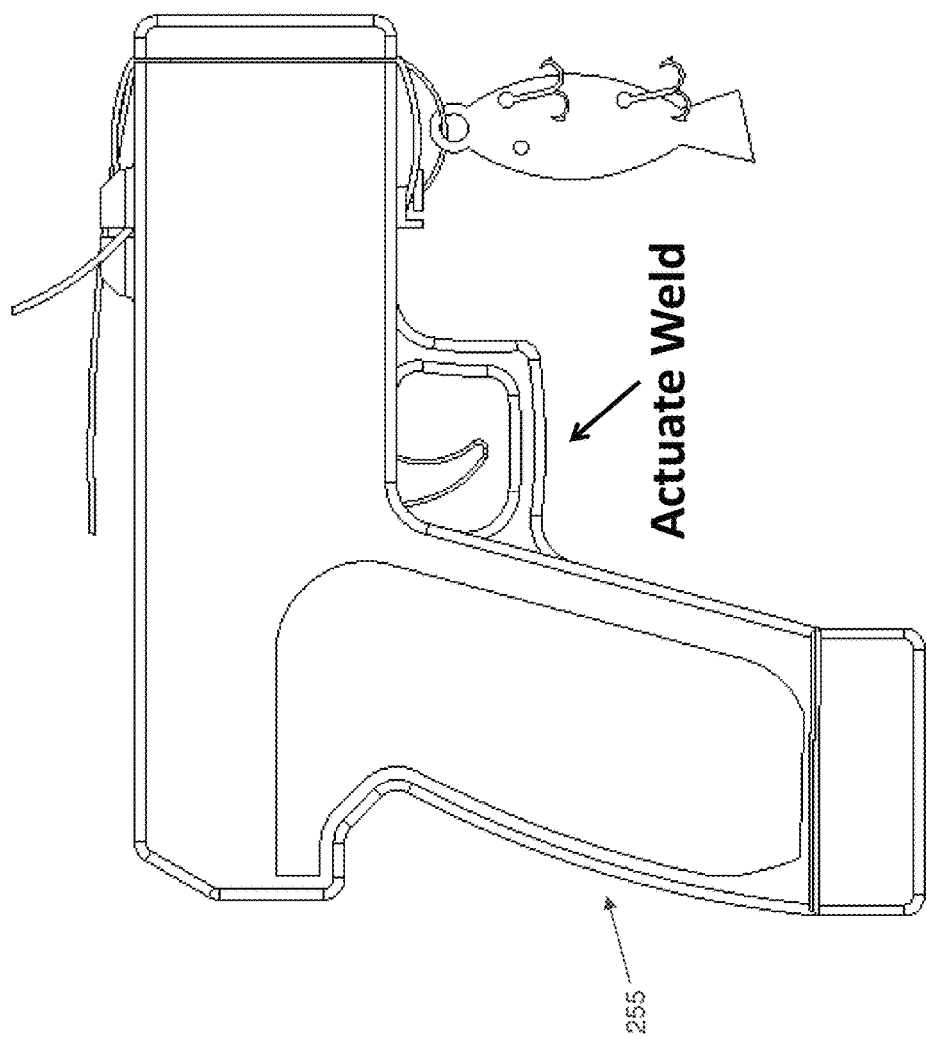

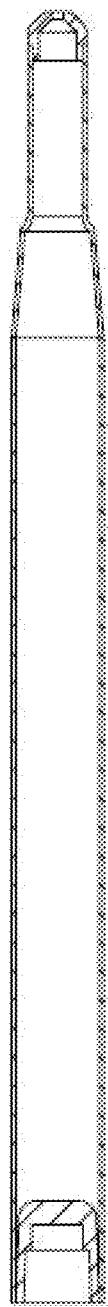
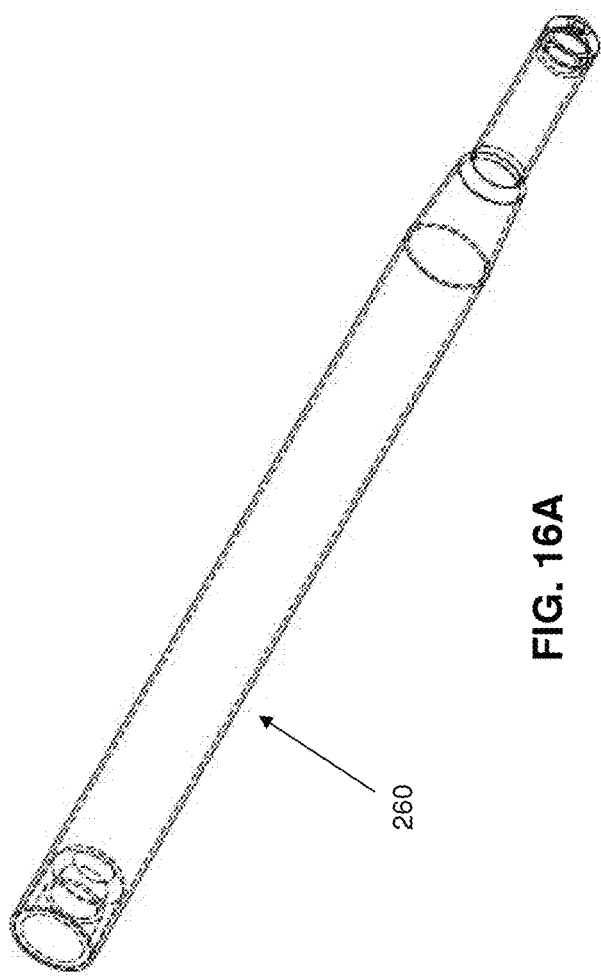
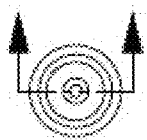
FIG. 16B
FIG. 16A

Line Diameter: D1 = Desired Line Diameter
Sleeve Diameter: D2 = 4*D1
Line Spacing: L1 = 2.5*D1
Sleeve Length: L2 = .425*(1.42E19^D1)
Sleeve End Length: L3 = .1*L2
Elliptical Minor Radius: L4 = .5*(D2-D1)
Cutoff Angle: A1 = arctan((L4+L1)/L3)

| Line Material | Line Break Strength (lb) | Line Diameter (in) | Sleeve Length (in) |
|---|---|---|---|
| Nylon | 2.4 | 0.004 | 0.5 |
| Nylon | 4.35 | 0.006 | 0.5 |
| Nylon | 12.94 | 0.01 | 0.75 |
| Nylon | 49 | 0.024 | 1.25 |
| Nylon | 85.1 | 0.036 | 2 |
| Fluoro | 99 | 0.04 | 2.4 |
| | | | |
| Exp Trend (Diameter) | 7.29897E+18 | 0.427819121 | |
| Exp Trend (Strength) | 1.01606737 | 0.521037244 | |

Estimation By Diameter

| Line Test Strength (lb) | Line Diameter (in) | Sleeve Length (in) |
|---|---|---|
| 2.5 | 0.004 | 0.51 |
| 4.8 | 0.006 | 0.56 |
| 12.8 | 0.01 | 0.66 |
| 40 | 0.024 | 1.21 |
| 80 | 0.036 | 2.04 |
| 100 | 0.04 | 2.43 |
| 130 | 0.048 | 3.44 |
| 150 | 0.052 | 4.09 |
| 200 | 0.058 | 5.31 |
| | 0.055 | 4.66 |
| | 0.039 | 2.33 |

Estimation By Strength

| Knot Strength (lb) | Line Diameter (in) | Sleeve Length (in) |
|---|---|---|
| 2.3 | 0.004 | 0.54 |
| 4 | 0.006 | 0.56 |
| 12.5 | 0.01 | 0.64 |
| 40 | 0.024 | 0.99 |
| 73 | 0.036 | 1.67 |
| 100 | 0.04 | 2.57 |
| 130 | 0.048 | 4.14 |
| 150 | 0.052 | 5.69 |
| 200 | 0.058 | 12.63 |

FIG. 18

$[Sheath\ Length] = .34 \times (1.41 \times 10^{23})^{[Line\ Diameter]}$

MATERIALS, METHODS AND DEVICES FOR JOINING LINES

REFERENCE TO PENDING PRIOR PATENT APPLICATION

This patent application claims benefit of prior U.S. Provisional Patent Application Ser. No. 61/744,079, filed Sep. 18, 2012 by Paul V. Fenton et al. for MATERIALS, METHODS AND DEVICES FOR JOINING LINES, which patent application is hereby incorporated herein by reference.

FIELD OF THE INVENTION

The present invention relates to devices and methods for joining monofilament and/or braided lines together using a flowable material such as an adhesive (e.g., a hot melt adhesive) or flowable polymer or blend or composite or low temperature metal, etc. that allows for bonding (mechanical and/or chemical) of the lines using a relatively lower melting temperature material and/or adhesive setting material.

BACKGROUND OF THE INVENTION

Recreational, commercial and sport fishing requires the use of fishing line which needs to be attached to a reel, to lines of different sizes and composition, to lures, hooks and weights, and the like. Current methods of knot-tying, metal crimping and/or fishing line welding require compressing, deforming, and/or abrading segments of line together, which have been shown to weaken the line strength. As a result, unintended or premature line breakage can occur.

Tying knots can be difficult due to line size, line stiffness, lighting (visibility) and cold temperatures (making it difficult to manipulate hands), etc.

Using metal crimping systems requires matching the correct crimp size to the line size in order to achieve optimal attachment. In addition, crimps require special tooling and the ability to apply the correct pressure to compress the line without excessively abrading the line, pinching the line, or leaving the crimp too loose so that the line ultimately slips.

Welding devices generally require the use of monofilament line, and also the use of special equipment to optimize the bond between the lines. However, with welding devices, the ability to bond different materials, or lines of different sizes, is not easy or straightforward, and has previously required compressing the line segments to weld, crimp, or tie them, which impacts the integrity of the raw line material and weakens the bond. Securing or joining lines together using any of the above methods generally, in most all instances, results in bond strength less than the line itself, which can result in line failure.

Failure can occur due to untying of knots, crimp slippage, weld bond failure, knots weakening the line, crimps weakening the line, weld heat or the friction stress of tying knots re-orienting the polymer materials in the line so as to weaken the line, etc.

U.S. Pat. No. 6,793,750 (Bittar) describes a hand-held fishing line welder that uses heat, RF energy or ultrasonic energy to heat and melt a monofilament line in order to bond it to another monofilament line, thereby creating a weld between the fishing lines. This approach can allow for joining lines of a single material and of a common size. However, the joining of lines of different materials, of different sizes, or a combination of different materials and different sizes, and maintaining a strong bond between the lines, is quite difficult using this approach. In addition, this welding approach requires compressing line segments together, which negatively impacts line strength at the bond. As such, developing a weld that is equal to, or stronger than, the original line strength is difficult using this welding technique.

It would, therefore, be advantageous to have a device that can join lines together (mechanically and/or chemically) in a quick, easy, and reproducible manner, for lines of the same or different materials, and for lines of the same or different sizes, using a hand-held device. The lines do not have to touch; in fact, having spacing between the lines will allow bonding material to surround or encase the lines, whereby to provide a much stronger bond. In addition, leaving space between individual line segments at the bond avoids compressing, abrading, deforming or otherwise impairing the physical integrity of the lines. The resulting bond can therefore be stronger than the original line strength.

SUMMARY OF THE INVENTION

Accordingly, the present invention relates to materials, methods and devices for providing a quick, easy and reproducible manner of joining fishing line segments, from one or more discrete lines and/or of a different or the same material and/or of the same or different size, together.

As used herein, the term "line" shall mean a polymer or metal line, particularly suitable for a fishing line, and may be a monofilament and/or braided line (including, but not limited to, polymer lines made of nylon, fluorocarbon, polyester, UHMWPE and/or biodegradable materials and, if metal, of steel, nitinol or titanium wire materials), of similar or differing materials and/or sizes and/or combinations of materials and/or sizes.

In one embodiment, a method and apparatus is used such that the fishing lines are held together in a parallel, non-contacting relation in a closed chamber and a flowable adhesive material (e.g., a hot melt adhesive material) is caused to enter the closed chamber to surround and encase the lines. After the hot melt adhesive material has set, the lines are removed from the closed chamber and are joined together in a strong bond.

As a further exemplary embodiment, a method and apparatus is used that also positions the fishing line segments in a closed chamber where the line segments are held so a flowable polymer sheath (or sleeve) can be molded around the line segments so that the line segments are locked together in a non-contacting parallel orientation. The line segments may, alternatively, be secured in a non-parallel non-contacting relationship. Segments from a single line may be secured together around a hook or other component, or segments from two or more lines may be secured together.

The polymer sheath (or sleeve) comprises a material that melts at a lower temperature than the lines themselves. The closed chamber is heated such that the material of the polymer sheath (or sleeve) melts so as to surround and encase the lines and, upon cooling, the line segments are joined together in a strong bond. The raw flowable polymer material may comprise a fluid, powder, solid component, or pellets that are introduced into the chamber such that, once heated, it is molded within the chamber, creating the polymer sheath (or sleeve) that encapsulates the line segments such that they are spaced apart, whereby to increase the contacting surface area between the line segments and polymer sheath (or sleeve). As an alternative embodiment of fabricating the bond, the raw material of the polymer sheath (or sleeve) may be in a flowable form that is actuated (i.e., set) using ultraviolet light or other mechanism, whereby to mold the flowable material so as to encapsulate the line segments in a bond, without relying on any melting of the raw material.

The resulting polymer sheath (or sleeve) may be formed in an elongate shape with one or more tapered ends so as to provide a smooth transition from the line to the polymer sheath (or sleeve); however, any other alternative shape that suits the application may also be utilized. The polymer sheath (or sleeve) may also be fabricated so as to partially encapsulate a component such as the eyelet of a hook or other component to be secured by the line segments, such that a smooth transition from the hook or other component to the line is produced.

The present invention also includes a device to carry out the methods heretofore described, and that device is a hand-held device that has a handle and jaws that can be moved between an open position and a closed position. When open, the lines can be inserted between the jaws and, when closed, the abutting jaws form a closed chamber where the joining of the lines takes place (e.g., by molding the flowable adhesive or flowable polymer around the lines).

In one embodiment of the hand-held device, an adhesive material (e.g., a hot melt adhesive) is injected into the closed chamber to surround and encase the lines, and when the material has set, the jaws can be opened and the joined lines removed, In another embodiment, one or both of the jaws has a heater and there is a meltable polymer sheath (or sleeve) that is located within the jaws of the hand-held device and the polymer sheath (or sleeve) positions the line segments in a non-contacting, parallel (or non-parallel) orientation within the closed chamber when the jaws are in their closed position. The heater can be activated and the raw polymer material melts at a temperature below the melting temperature of the line(s), such that the polymer material flows in the closed chamber to surround and encase the line segments and, upon cooling, the line segments are strongly joined together by the polymer.

The molding instrument embodiments of the invention may comprise a cartridge system that houses the raw polymer material in the form of a fluid, powder, pellet or solid. This facilitates loading of the raw polymer material, changing polymer materials, and/or the addition of colors or other enhancement features such as scents, additives, or reinforcement materials, etc., whereby to enhance the ability of a single molding instrument to create polymer sheaths (or sleeves) with varying characteristics. Additionally, the mold cavity may be replaceable so as to accommodate different line segment sizes, different numbers of line segments (e.g., three of more line segments may be molded together with a single polymer sheath or sleeve), different orientations of line segments in parallel or non-parallel orientations, or the encapsulation of hook or other components within the polymer sheath (or sleeve).

The embodiments of the invention improve the bond strength between at least two line segments. The line segments may be spaced apart at the bond so as to avoid impairing the material of the lines. The segments may comprise discrete lengths of a single line; alternatively, the segments may comprise two or more lines that may be secured together. The embodiments of the invention may be used to secure segments of at least one line to secure a hook, lure, weight, additional fishing line(s) and/or other fishing components. In addition, the embodiments may attach at least one line for other applications outside of fishing. In particular, any application in which two segments of line, thread, yarn, suture, wire or other flexible elongated material are bonded together may benefit from the embodiments of the invention, which secure at least two segments together such that they are spaced apart so as to improve bond strength and the profile of the bond while preserving the physical integrity of the raw line material.

In one preferred form of the invention, the invention comprises the provision and use of a molded fastener, formed at least in part out of a flowable material, to secure two or more line segments in position relative to one another. In use, the line segments are positioned with a desired orientation (e.g., in a parallel or non-parallel, spaced relationship), the flowable material is flowed about the line segments so as to engulf the line segments, and then the flowable material is set so as to form an encasing structure about the line segments, whereby to lock the line segments in position relative to one another.

In one form of the invention, the molded fastener is formed in situ, e.g., the line segments are positioned in a mold with the desired orientation, the flowable material is flowed into the mold and about the line segments, and then the flowable material is set so as to form the encasing structure about the line segments, whereby to lock the line segments in position relative to one another.

In another form of the invention, the molded faster is at least partially pre-formed, and then the final configuration of the molded fastener is effected in situ, e.g., the line segments are positioned in the at least partially pre-formed molded fastener, the flowable material is flowed about the line segments, and then the flowable material is set so as to form the encasing structure about the line segments, whereby to lock the line segments in position relative to one another.

The flowable material may comprise any material capable of performing the desired function. In one form of the invention, the flowable material forms a mechanical bond with the line segments when set. In another form of the invention, the flowable material forms a chemical bond with the line segments when set. And in another form of the invention, the flowable material forms both mechanical and chemical bonds with the line segments when set. The flowable material may comprise an adhesive (including a hot melt adhesive) and/or a flowable polymer and/or any other appropriate material, and flowing/setting of the flowable material may be effected according to the nature of the flowable material, e.g., heating/cooling, the absence or presence of UV light, the absence or presence of a reactant, etc.

In one preferred form of the present invention, there is provided a system for securing at least two line segments in position relative to one another, the system comprising:

a molded faster formed at least in part out of a flowable material, wherein the flowable material is flowed about the at least two line segments after the at least two line segments have been positioned with a desired orientation and is thereafter set, whereby to form an encasing structure about the at least two line segments, whereby to lock the at least two line segments in position relative to one another.

In another preferred form of the present invention, there is provided a method for securing at least two line segments in position relative to one another, the method comprising:

positioning the at least two line segments in a hand-held tool with a desired orientation;

using the hand-held tool to flow flowable material about the at least two line segments so as to engulf the at least two line segments; and setting the flowable material in the hand-held tool so as to form a molded fastener which acts as an encasing structure about the at least two line segments, whereby to lock the at least two line segments in position relative to one another.

In another preferred form of the present invention, there is provided a method for joining lines, the method comprising the steps of:

positioning the lines in a side by side relationship in a closed chamber;

introducing an adhesive material into the closed chamber to surround the lines; and allowing the adhesive material to encase the lines and join the lines together.

In another preferred form of the present invention, there is provided a method for joining lines having a melting temperature, the method comprising the steps of:

providing a meltable fastener having a melting temperature below the melting temperature of the lines;

affixing the lines to the meltable fastener in a non-contacting, parallel orientation; and heating the meltable fastener to the melting temperature of the meltable fastener to cause the meltable fastener to flow and surround and encase the lines to join the lines together.

In another preferred form of the present invention, there is provided a hand-held device to carry out the joining of lines, the device comprising a handle having a pair of jaws, at least one of the jaws being movable with respect to the other of the jaws to an open position wherein the jaws are spaced apart and a closed position wherein the jaws are abutting each other, the jaws forming a closed chamber when in the closed position, and a means of introducing an adhesive material into the closed chamber to surround and encase the lines to join the lines together.

In another preferred form of the present invention, there is provided a hand-held device to carry out the joining of lines having a melting temperature, the device comprising a handle having a pair of jaws, at least one of the jaws being movable with respect to the other of the jaws to an open position wherein the jaws are spaced apart and a closed position wherein the jaws are abutting each other, the jaws forming a closed chamber when in the closed position, at least one heater adapted to be activated to heat the closed chamber, a meltable fastener positioned within the closed chamber and adapted to retain the lines in a non-contacting parallel orientation, the at least one heater adapted to heat the meltable fastener to a temperature below the melting temperature of the lines to cause the meltable material to flow and surround and encase the lines to join the lines together.

In another preferred form of the present invention, there is provided a device to carry out the joining of lines having a melting temperature, the device comprising an upper housing and a lower housing, at least one of the housings being movable between a closed position where the upper and lower housings abut against each other forming a closed chamber therebetween and an open position where the upper and lower housings are separated from each other, at least one of the upper and lower housing having a heater to heat the closed chamber, a meltable fastener positioned within the closed chamber and adapted to retain the lines in a non-contacting parallel orientation, the at least one heater adapted to heat the meltable fastener to a temperature below the melting temperature of the lines to cause the meltable material to flow and surround and encase the lines to join the lines together.

BRIEF DESCRIPTION OF THE DRAWINGS

These and other features and advantages of the present invention will become more readily apparent during the following detailed description of the preferred embodiments of the invention, which is to be considered in conjunction with the accompanying drawings wherein like numbers refer to like parts and further wherein:

FIG. 1A is a schematic view of an exemplary embodiment of the present invention using a syringe for injecting an adhesive material or flowable polymer to contact the line segments;

FIG. 1B is a schematic view of the actual injection of the adhesive material or flowable polymer to contact the line segments;

FIG. 1C is a schematic view of a step of removing the syringe after the injection of the adhesive material or flowable polymer has been completed;

FIG. 2A is a perspective view of an exemplary embodiment of the present invention joining two line segments together;

FIG. 2B is a perspective view of a shrink tube usable to carry out the embodiment of FIG. 2A;

FIG. 3A is a perspective view of an exemplary embodiment of the present invention illustrating the introduction of a line into a clamshell encasement for joining portions of the line together;

FIG. 3B is a perspective view of the embodiment of FIG. 3A with the portions of the line secured within the encasement;

FIG. 3C is a schematic view of the step of injecting an adhesive material or flowable polymer or other flowable material into the encasement so as to join the portions of the line segments together;

FIGS. 9A-9D are schematic views of a hand-held device utilized to produce a polymer sheath fastener that joins segments of line together in accordance with an embodiment of the present invention;

FIGS. 10A-10F are schematic views showing operational aspects of the device embodiment shown in FIGS. 9A-9D;

FIG. 11 is a perspective view of a representative mold cavity utilized to produce a polymer sheath fastener in accordance with the device embodiment shown in FIGS. 9A-9D and 10A-10F;

FIGS. 14A-14L are schematic views of the resulting polymer sheath (or sleeve) construct that secures individual line segments together, with the individual line segments being separated by a pre-defined space so as to increase bond integrity in accordance with an embodiment of the present invention;

FIGS. 15A-15E are side views of an alternative hand-held device that incorporates an adhesive polymer cartridge system for injecting polymer sheath material into a mold containing line segments so as to secure those line segments together in accordance with an embodiment of the present invention;

FIGS. 16A-16C are schematic views of an adhesive polymer filled cartridge in accordance with the embodiment of FIGS. 15A-15E;

FIG. 18 is a table showing performance characteristics for the present invention;

DETAILED DESCRIPTION OF THE INVENTION

Figure 4A:
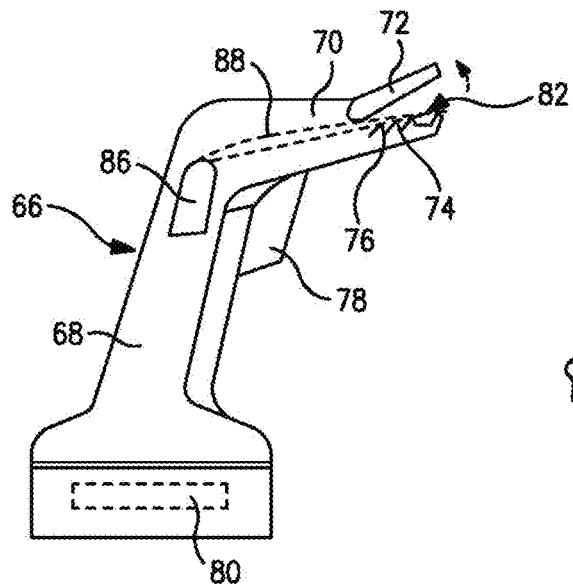
FIG. 4A is a side view of a hand-held device of the present invention that is usable to join two or more line segments together.

Referring now to FIGS. 1A-1C, there is shown schematic views of an exemplary embodiment of the present invention. Accordingly, taking FIG. 1A, there is a side schematic view illustrating two lines 10, 12 that are to be joined together in accordance with the present invention. As can be seen in FIG. 1A, the lines 10, 12 pass through a sleeve 14 that has sealing devices 16 (such as clamps) that provide lateral seals between the lines 10, 12 and the sleeve 14, creating a closed chamber 18 therein. It should be noted that the lines 10, 12 may comprise segments from a single line, or segments from two or more lines, which will be secured together by a polymer sheath (or sleeve), with that polymer sheath (or sleeve) having a pre-defined geometry determined by the geometry of the closed chamber (or cavity) 18.

As also can be seen in FIG. 1A, there is a syringe 20 that is in communication with the closed chamber 18 to allow a sealing, adhesive or bonding material to be injected into the closed chamber 18, whereby to surround and encase the line segments 10, 12. It should be noted that this embodiment of the invention, as well as subsequent embodiments of the invention, may bond together at least two line segments, with those two line segments being from a single line, from two lines, or from more than two lines; alternatively, a hook, other fishing component, or miscellaneous part may be secured to one or more line segments by encapsulating a portion of the component to the line segment(s) via the molded adhesive bond construct, such that a bond is formed.

Examples of adhesive materials usable with the present invention include, but are not limited to, hot melt adhesives, epoxies, cyanoacrylates, acrylics, polyurethanes, silicones, phenolics, polyimides, plastisols, polyvinyl acetate and derivatives thereof.

The sealing, adhesive, or bonding material may also comprise flowable polymers, co-polymers, blends, composites, low temperature metals, etc., or any other flowable material appropriate for use with the present invention.

As to hot melt adhesives or flowable polymer materials, hot melt adhesives or flowable polymers are applied onto the lines to be bonded as adhesives, flowable melts, fluids that solidify, and/or flowable polymers. The hot melt adhesives or flowable polymer melts are molded in situ so as to encapsulate the line segments, set and then solidify upon cooling, whereby to secure together those line segments.

For example, hot melt adhesives or flowable polymers often possess a moderate-to-long "open time" (defined as the time span between adhesive application and assembly of the line segments being joined), but after immobilization of the line segments being joined, the hot melt adhesives or flowable polymers must set quickly enough to ensure a bond of appropriate quality. In addition to setting speed, viscosity is also an important property of a hot melt adhesive or flowable polymer. For uniform hot melt adhesive or flowable polymer application, the viscosity should be sufficiently low at a corresponding application temperature. Hot melt adhesives are highly thermally stressed over long periods of time upon application. One important requirement is, therefore, good thermal stability at application temperature. The thermal stability of hot melt adhesives or flowable polymers depends, among other factors, on the compatibility of the components on which the hot melt adhesive or flowable polymer is based. Incompatibility often exists, especially in the case of components that enhance adhesion. Hot melt adhesives or flowable polymers are usually based on one or more base materials, with various additives. The composition is usually formulated so as to have a glass transition temperature below the lowest service temperature and a suitably high melt temperature. The degree of crystallization should be as high as possible but within the limits of allowed shrinkage. The melt viscosity and the crystallization rate (corresponding "open time") can be tailored. A faster crystallization rate usually implies a higher bond strength. The present embodiment allows the sealing, adhesive or bonding material to be tailored for optimum performance for the conditions of use and the line segments being bonded.

The nature of the adhesive or flowable polymer or other flowable material and the additives influences the nature of mutual molecular interaction and interaction with the line segments. Good wetting of the line segments is often desirable for forming a satisfying bond between the adhesive, etc. and the line segments. More polar compositions tend to have better adhesion due to their higher surface energy. Amorphous adhesives or polymers deform easily, and tend to dissipate most of the mechanical strain within their structure, passing only small loads onto the adhesive/line segment interface; even a relatively weak nonpolar-nonpolar surface interaction can then form a fairly strong bond prone primarily to a cohesive failure. The distribution of molecular weights and the degree of crystallinity influences the width of the melting temperature range. Polymers with a crystalline nature tend to be more rigid and have higher cohesive strength, than the corresponding amorphous ones, but they also transfer more strain to the adhesive/line segment interface. Higher molecular weights of the polymer chains provide higher tensile strengths and heat resistance. All of these conditions are to be considered in producing materials to optimize the resulting bonded sleeve (or sheath) structure.

An increase in bond strength and service temperature can be achieved by the formation of cross links in the polymer after solidification. This can be achieved by using polymers undergoing curing with residual moisture (e.g., reactive polyurethanes, silicones, etc.), exposition to UV radiation and the like.

Some of the possible base materials are, but are not limited to: Ethylene vinyl acetate (EVA), Ethylene Acrylate (ethylene n-butyl acrylate (EnBA), ethylene-acrylic acid (EAA), ethylene-ethyl acetate (EEA)), Polyolefins (PO) (polyethylene (LDPE and HDPE), atactic polypropylene (PP or APP), Polybutene-1, Amorphous polyolefin (APO) polymers, Polyamides, polyesters, Polyurethanes and Styrene block copolymers (SBC).

In addition, other materials that are biodegradable may also be utilized so as to provide a means for the polymer to erode over time in the environment under certain conditions. Such materials may comprise biodegradable polymers that have been treated so as to be easily broken down by microorganisms and return to nature. Many technologies exist today that allow for such treatment. Currently there are some synthetic polymers that can be broken down by microorganisms (e.g., polycaprolactone), others are polyesters and aromatic-aliphatic esters which, due to their ester bonds, are susceptible to attack by water. Some examples of these are the PHA family of natural polymers that include poly-3-hydroxybutyrate, and in addition, the renewably-derived polylactic acid, and the synthetic polycaprolactone. Others are the cellulose-based cellulose acetate and celluloid (cellulose nitrate).

The hot melt adhesives or flowable polymers or other flowable materials can also contain, in addition to the aforesaid base materials, other additives. These include, for example, plasticizers, tackifiers, stabilizers, waxes, adhesion promoters, fillers, elastic thermoplastics and antioxidants. Specific applications-engineering properties (e.g., cohesive strength, viscosity, elastics properties and softening point) can thereby be influenced.

The adhesives or flowable polymers are selected by one skilled in the art in such a way that good compatibility exists with the other additives of the hot melt adhesive or flowable polymer.

If applicable, the hot melt adhesive or flowable polymer can have waxes added to it, e.g., in quantities from 0 to 45 wt %. The quantity is preferably such that the viscosity is lowered into the desired range, but adhesion is not negatively influenced. The wax can be of natural origin, chemically-modified form, or synthetic. Plant waxes and animal waxes can be used as natural waxes, also mineral waxes or petrochemical waxes. As chemically modified waxes, hard waxes such as montan ester waxes, sasol waxes, etc. can be used. Polyalkylene waxes and polyethylene glycol waxes are utilized as synthetic waxes. Petrochemical waxes such as petrolatum, paraffin waxes, microcrystalline waxes and synthetic waxes can be used.

Plasticizers are used in order to adjust the viscosity or flexibility of the final construct, and are contained in the hot melt adhesive or flowable polymer generally at a concentration of from 0 to 20 wt %. Suitable plasticizers are mineral oils, naphthenic mineral oils, polypropylene, polybutene, polyisobutylene, polyisoprene oligomers, hydrogenated polyisoprene and/or polybutadiene oligomers, benzoate esters, phthalates, adipates, vegetable or animal oils, and derivatives thereof. Hydrogenated plasticizers are selected, for example, from the group of the paraffinic hydrocarbon oils. Polypropylene glycol and polybutylene glycol, as well as polymethylene glycol, are also suitable. Esters are also used, as applicable, as plasticizers, for example liquid polyesters and glycerol esters, or plasticizers based on aromatic dicarboxylic acid esters.

The purpose of the stabilizers is to protect the adhesive or polymer composition from breakdown during processing. Antioxidants and light-protection agents are among those which are preferred. They are added to the hot melt adhesive or flowable polymer, typically in quantities of up to 3 wt %.

Further additives can also be incorporated into the hot melt adhesive or flowable polymer in order to vary specific properties. These can be, for example, dyes, or fillers such as titanium dioxide, talc, clay and the like.

The hot melt adhesive or flowable polymer can also contain adhesion promoters. Adhesion promoters are substances that improve the adhesion of the hot melt adhesive or flowable polymer with respect to the line segments that are to be adhesively bonded. Among other things, the adhesion promoters are intended to improve the aging behavior of adhesive bonds under the influence of a moist atmosphere. Typical adhesion promoters are, for example, ethylene/acrylamide comonomers, polymeric isocyanates, reactive organosilicon compounds or phosphorus derivatives. The wetting properties of the adhesive or flowable polymer on the substrates can likewise be influenced.

The additives, such as plasticizers, stabilizers, or adhesion promoters, are known to one skilled in the art. They are commercial products, and one skilled in the art can select them in accordance with the desired properties. Care must, of course, be taken for compatibility with the adhesive or flowable polymer and the line segments being joined.

The hot melt adhesive or flowable polymer or other flowable material is generally manufactured by mixing. In this context, all of the components can be made ready simultaneously, heated, and then homogenized; or firstly, the more-easily melted components are made ready and mixed, and then the further adhesive or polymer constituents are added, and finally further additives that are temperature-sensitive are added. It is also possible to manufacture the hot melt adhesive or flowable polymer continuously in an extruder. After decanting or portioning of the completely homogenized mixture, it is allowed to cool, whereupon it solidifies.

The hot melt adhesive in this example is of solid consistency and (aside from contaminants) free of solvents. Methods for manufacturing, decanting, and packaging hot melt adhesives are known to one skilled in the art. It is homogeneous in the solid and liquid phase, i.e., a melt is clear and not opaque or cloudy. No separation of the hot melt adhesive constituents is to be observed even if the melted state continues for a long time.

In terms of utilization, it is best to use a hot melt adhesive or flowable polymer having the lowest possible viscosity at application temperature. This ensures better applicability and easier delivery of the hot melt adhesive or flowable polymer. Wetting of the line segments is also thereby promoted. Good application properties are achieved with the hot melt adhesive or flowable polymer according to the present invention. No separation of individual constituents, or phase separation, is to be observed even when held for a longer period in the molten phase. Adhesion to the line segments is good. Bonding of the adhesive or flowable polymer exists even at different temperatures.

In FIG. 1B, there can be seen the actual injection of the adhesive material or flowable polymer or other flowable material 22 into the closed chamber 18 so as to surround both of the line segments 10, 12 for joining them together.

As seen in FIGS. 1A-1C, there is an appearance that the two lines 10, 12 are in contact with each other, however, in the exemplary embodiment, the lines 10, 12 are parallel but separated from one another by a finite distance so that the adhesive material or flowable polymer 22 can enter into the space between the lines 10, 12, whereby to enhance the ultimate joinder of the lines 10, 12.

Lastly, in this embodiment, in FIG. 1C, the syringe 20 has been withdrawn and is no longer in communication with the closed chamber 18, such that the adhesive material or flowable polymer or other flowable material is allowed to set. The sleeve 14 can then be removed since the joining of the lines 10, 12 has been completed.

Turning next to FIGS. 2A and 2B, there is shown a sleeve 24 that can be used with the present invention and which is basically a cylindrical configuration with a hollow core 26 therethrough. Sleeve 24 can be made out of flexible plastic material. In FIG. 2A, the lines 10, 12 can be seen passing though the sleeve 24 such that the adhesive material or flowable polymer or other flowable material can be injected into the space between the sleeve and the line segments 10, 12 so as to join the line segments 10, 12 together as described with respect to the FIG. 1A-1C embodiment. Again, upon setting of the adhesive material or flowable polymer or other flowable material, the sleeve 24 can simply be removed, leaving the line segments 10, 12 joined together by the set adhesive or flowable polymer or other flowable material. Alternatively, if desired, sleeve 24 can remain part of the bonding construct.

It will be appreciated that the line segments 10, 12 can be of differing diameters and still be efficiently and strongly joined together with the use of the present invention and, as will be appreciated, the use of differing diameter lines, or lines having different materials, can be joined by means of any of the embodiments disclosed and explained in the present specification.

In addition, as is true of the line segments 10, 12, and as well as all further embodiments shown herein, the bonding process may be enhanced by some treatment of the relevant portions of the line segments, either chemical or mechanical, so as to make the ultimate joint stronger. The chemical enhancement may be by etching the ends of the lines, the mechanical enhancement may be by roughing the lines. The enhancement may also be effect by appropriate thermal processing.

Turning next to FIGS. 3A-3C, there is shown perspective views of an exemplary embodiment of the present invention, wherein a single line 28 is used to form a loop 30 in which segments of the line 28 are secured together by an adhesive or flowable polymer or other flowable material construct. As will be appreciated, while a loop 30 is formed in this embodiment, the same invention can also be used to join two separate lines together.

In embodiment of FIGS. 3A-3C, a clamshell encasement 32 is used. Clamshell encasement 32 comprises an upper section 34 and a lower section 36 joined together by means of a hinge 38. The hinge 38 may be a living hinge or other type of hinge so as to allow the upper section 34 and lower section 36 to be pivotally affixed to one another along one edge thereof.

As can also be seen in FIG. 3A, the upper section 34 has a pair of separate, semicircular channels 40, 42 formed therein, with a ridge 44 located therebetween; and, in likewise manner, the lower section 36 also has a pair of semicircular channels 46, 48 formed therein, with a ridge 50 located therebetween. In FIG. 3A, the clamshell encasement 32 is shown in its open position, such that the two separate segments 52, 54 of the single line 28 can be oriented within the aligned channels 40, 42 of upper section 34 and the aligned channels 46, 48 of lower section 36, whereby to retain the segments 52, 54 securely within the clamshell encasement 32.

A set of tabs 56 on the upper section 34 latches with a pair of recesses 58 formed on the lower section 36 so that the upper and lower sections 34, 36 can latch together, whereby to secure the clamshell encasement 32 in its closed position as shown in FIG. 3B, however, various alternative devices and latches can also be used to secure the clamshell encasement 32 in the closed position.

As such, with the clamshell encasement 32 in the closed position shown in FIG. 3B, the respective channels 40, 42 and 46, 48 surround the separate segments 52, 54 of the line 28 and form a seal between the line 28 and the separate segments 52, 54 against the clamshell encasement 32, thereby forming a closed chamber 60 within the clamshell encasement 32. As also seen in FIG. 3B, there is an inlet 62 in the upper section 34 of the clamshell encasement 32 and its purpose will be later explained.

Turning then to FIG. 3C, taken along with FIGS. 3A and 3B, there is a perspective view of the present invention and illustrating the use of a syringe 64 that is used to inject the adhesive material or flowable polymer or other flowable material into the closed chamber 60 so as to allow the adhesive material or flowable polymer or other flowable material to surround the line 28 and, when set, join the separate segments 52, 54 together via the adhesive or flowable polymer or other flowable material construct.

Turning next to FIGS. 4A-4D, there is shown perspective views of a portable hand-held device 66 that can be used to join two line segments together. Accordingly, in FIG. 4A, the hand-held device 66 is shown as having a handle 68 and a forward section 70 that extends laterally outwardly from the handle 68. The forward section 70 includes an upper jaw 72 and a lower jaw 74.

Figure 4B:
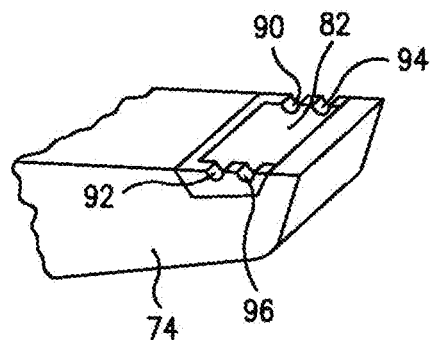
FIG. 4B is an enlarged perspective view of the lower jaw of the hand-held device of FIG. 4A.
Figure 4C:
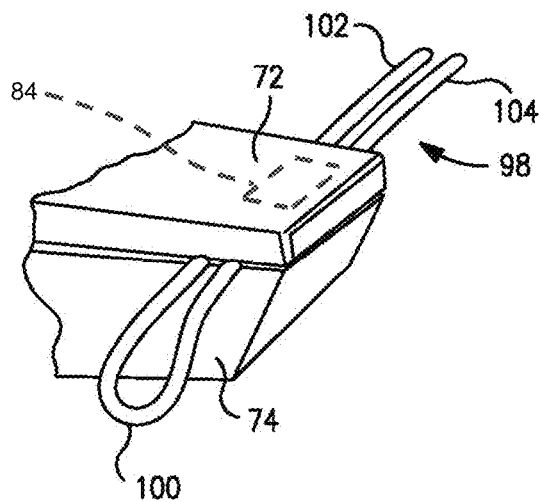
FIG. 4C is an enlarged view showing the jaws of the hand-held device of FIG. 4A in their closed position to join the line together.
Figure 4D:
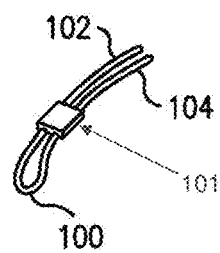
FIG. 4D is a perspective view of a line having been joined together in accordance with the steps of FIGS. 4A-4C.

In the embodiment of FIG. 4A, the upper jaw 72 is pivotable between an open position (as shown in FIG. 4A)

and a closed position where the upper jaw and lower jaw 72, 74 abut against each other (FIG. 4C). In this respect it should be appreciated that while only the upper jaw 72 is shown in FIGS. 4A-4D as movable or pivotable, in alternative embodiments the lower jaw 74 may be movable or, alternatively, both the upper and lower jaws 72, 74 can be movable. The opening and closing of the jaws 72, 74 may be accomplished manually or by means of some mechanism within the hand-held device 66.

In the embodiment of FIG. 4A, a heater 76, such as a resistance heater, is located in the lower jaw 74 for a purpose that will be later explained and, again, the heater 76 may be in the lower jaw 74, the upper jaw 72 or both the upper and lower jaws 72, 74. Control for the heater 76 may be by means of a trigger switch 78 located for the convenience of the user, with the power being supplied by one or more batteries 80 located in the handle 68. The batteries 80 may be disposable or conventional rechargeable batteries that can be recharged by a separate power source. Alternatively, the hand-held device 66 may be powered by a line cord (not shown) plugged into a receptacle on, for example, a boat.

As can be seen in FIGS. 4A and 4B, there is a cavity 82 formed in the lower jaw 74 and, when the upper and lower jaws 72, 74 are closed together, there is formed a closed chamber 84 (FIG. 4C) therebetween that includes the cavity 82. A source of adhesive material or flowable polymer or other flowable material can be provided in a reservoir 86 located in the hand-held device 66, such as within the handle 68, that can be forced through a supply line 88 to inject the adhesive material or flowable polymer or other flowable material into the closed chamber 84. Alternatively, the adhesive material or flowable polymer or other flowable material can be supplied from an external source.

Turning then to FIG. 4B, there is shown an enlarged perspective view of the lower jaw 74 and illustrating the cavity 82 formed therein. As can be seen in FIG. 4B, there are two sets of grooves, that is, there is a first set 90, 92 and a second set 94, 96, that are parallel, spaced-apart, and provide a means of accurately orienting lines along the lower jaw 74 such that the lines span the cavity 82 in parallel, spaced-apart relation.

Turning then to FIG. 4C, taken along with FIGS. 4A and 4B, there is shown the upper and lower jaws 72, 74 in their closed position, thereby forming the closed chamber 84. In this embodiment, there is a single line 98 that forms a loop 100 such the two separate line segments 102, 104 of the line 98 pass though the closed chamber 84 and the separate line segments 102, 104 are aligned within the grooves 90, 92 and 94, 96 such that the line segments 102, 104 are held in a parallel orientation while separated from each other.

The adhesive material or flowable polymer or other flowable material is then injected into the cavity 82 of the closed chamber 84 so as to surround and encase the line segments 102, 104 of the line 98. Once the adhesive material or flowable polymer or other flowable material properly sets, the upper and lower jaws 72, 74 can be opened and the line 98 removed, with the set adhesive material or flowable polymer forming a solid structure (e.g., a sheath or sleeve) 101 (FIG. 4D) that fully joins the line segments 102, 104 together and sealing the loop 100.

It can be seen that the adhesive material or flowable polymer or other flowable material can comprise a wide variety of adhesives and flowable polymers or other flowable material that can join the line segments. Thus, in an alternative embodiment, the adhesives or polymers or other flowable material may be molded around the line segments as a flowable fluid or mass that then can be activated by a number of setting mechanisms. By way of example but not limitation, the present invention may utilize UV-activated adhesives with a UV light provided within the jaws 72, 74 to carry out the curing, or the adhesive material may be a multi-component adhesive such as an epoxy material.

Furthermore, while a loop 100 is illustrated in the embodiment of FIGS. 4A-4D, it can be seen that the same hand-held device 66 can be used to simply join two or more line segments (of the same or discrete lines) together, and the line segments may be of differing diameters or materials. Also, the hand-held device 66 can be used to secure at least one hook and/or other component to a single line segment or to multiple line segments. Due to the encapsulation capabilities of the present invention, the resulting molded sheath (or sleeve) 101 may also be configured by the geometry of the molding chamber to cover the eyelet of the hook or other component.

Thus it will be seen that with the embodiments of FIGS. 1A-1C, 2A and 2B, 3A-3C and 4A-4D, the line segments which are to be secured together are positioned within a mold or cavity, then an adhesive or flowable polymer or other flowable material is introduced into the mold so that the adhesive or flowable polymer or other flowable material flows around the line segments within the mold, and then the adhesive or flowable polymer or other flowable material is set so as to form a solid construct (e.g., a sheath or sleeve) which secures the line segments to one another.

Figure 5A:
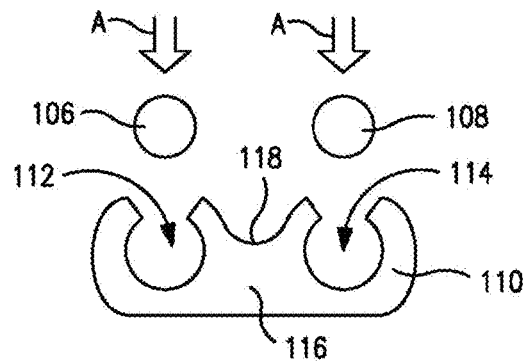
FIG. 5A is a schematic view of an exemplary embodiment of the present invention illustrating line segments positioned for introduction into a meltable polymer sheath (or sleeve) device.

Turning next to FIGS. 5A-5D, there is shown schematic views illustrating an exemplary embodiment of the present invention that uses a meltable material, e.g., a flowable polymer, to carry out the joining of two or more line segments. In FIG. 5A, there can be seen two line segments 106, 108 in position to be fitted, by movement in the direction of the arrows A, into a pre-formed polymer sheath (or sleeve) 110. The pre-formed polymer sheath (or sleeve) 110 comprises a material that has a melting temperature that is lower than the melting temperature of the line segments 106, 108, and is configured so as to have two circular indentations 112, 114 dimensioned to receive and retain the line segments 106, 108, with the line segments 106, 108 being separated by a center portion 116.

The material for the pre-formed polymer sheath (or sleeve) 110 can be any material that has a lower melting (or glass transition) temperature than the line segments 106, 108 and, upon melting, the melted polymer sheath (or sleeve) 110 surrounds and fully encases the line segments 106, 108 so as to join them together chemically and/or mechanically. The polymer sheath (or sleeve) material may be formed out of a fully biodegradable material.

Figure 5B:
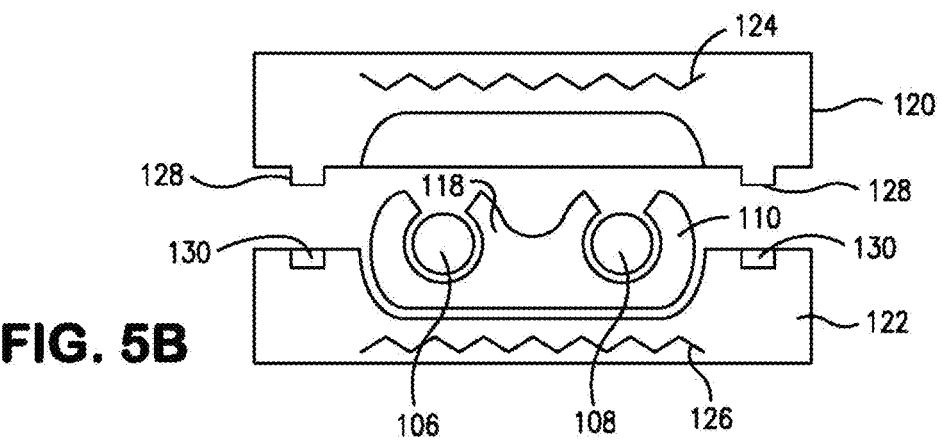
FIG. 5B is a schematic view of the embodiment of FIG. 5A, with the line segments positioned within the meltable polymer sheath (or sleeve) device and with the meltable polymer sheath (or sleeve) device contained within a clamshell encasement, with the clamshell encasement being in its open position.

In this form of the invention, the pre-formed polymer sheath (or sleeve) 110 comprises an upper portion 118 that provides an excess of material, the purpose of which will be later explained. Turning next to FIG. 5B, there is shown a schematic view of the line segments 106, 108 and the pre-formed polymer sheath (or sleeve) 110 positioned within an upper housing 120 and a lower housing 122. While the upper and lower housings 120, 122 are illustrated to be two separate housings, it will be appreciated that the upper and lower housings 120, 122 can be hinged together, e.g., in the manner of the upper and lower jaws 72, 74 of FIG. 4A. As such, while this embodiment will be described as using housings, the steps of FIGS. 5A-5D are also intended to be carried out using a hand-held device similar to the hand-held device 66 of FIG. 4A.

The upper and lower housings 120, 122 include, like the upper and lower jaws, 72, 74 of FIG. 4A, respectively, an upper heater 124 and a lower heater 126 that can be activated by a user so as to provide the heat needed to melt the pre-formed polymer sheath (or sleeve) 110, i.e., so that it may be molded about line segments 106, 108. In FIG. 5B, the upper and lower housings 120, 122 are in their open position and there may be male keys 128 and corresponding female recesses 130 to align the housings 120, 122 as they are moved toward the closed position of FIG. 5C. Again, as described with respect to the embodiment of FIG. 4A, while an upper and lower heater 124, 126 is disclosed in this embodiment, there may be a heater in only one of the upper or lower housing 120, 122 in carrying out the present invention.

Figure 5C:
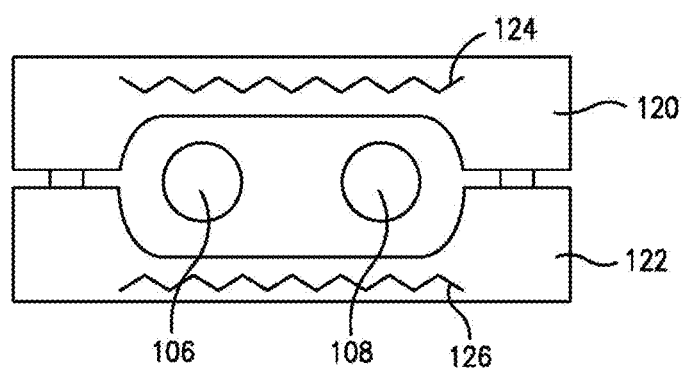
FIG. 5C is a schematic view of the embodiment of FIG. 5A with the polymer sheath (or sleeve) device contained within a clamshell encasement and with the clamshell encasement in its closed position.

Thus, in FIG. 5C, the upper and lower heaters 124, 126 have been activated to melt the polymer material of the pre-formed polymer sheath (or sleeve) 110, such that the material of the polymer sheath (or sleeve) 110 flows over and between the line segments 106, 108, whereby to join those line segments together. As noted, the excess material of the pre-formed polymer sheath (or sleeve) 110 at the upper portion 118 of the pre-formed polymer sheath (or sleeve) 110 provides material sufficient to cover the upper surfaces of the line segments 106, 108 so that the line segments 106, 108 are fully encased in the material of the polymer sheath (or sleeve) 110.

Figure 5D:
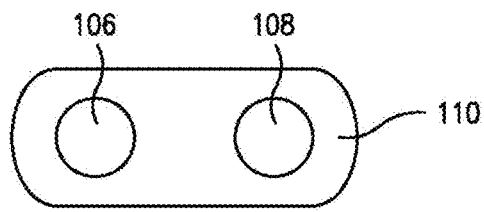
FIG. 5D is a schematic view of the embodiment of FIG. 5A, with the line segments joined together within the melted polymer sheath (or sleeve) device.

The final result is illustrated in FIG. 5D, where the line segments 106, 108 are fully encased in the material of the polymer sheath (or sleeve) 110 such that they are securely joined together. The material of the polymer sheath (or sleeve) can also be provided in strips, pre-fabricated molds, microspheres, powder, fluid, pellets, sheets, polymer coated stents and the like in this embodiment and in other embodiments herein disclosed.

Figure 6A:
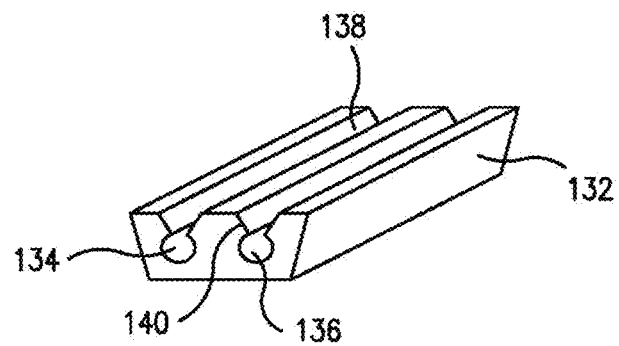
FIG. 6A is a perspective view of a polymer sheath (or sleeve) usable with the present invention.
Figure 6B:
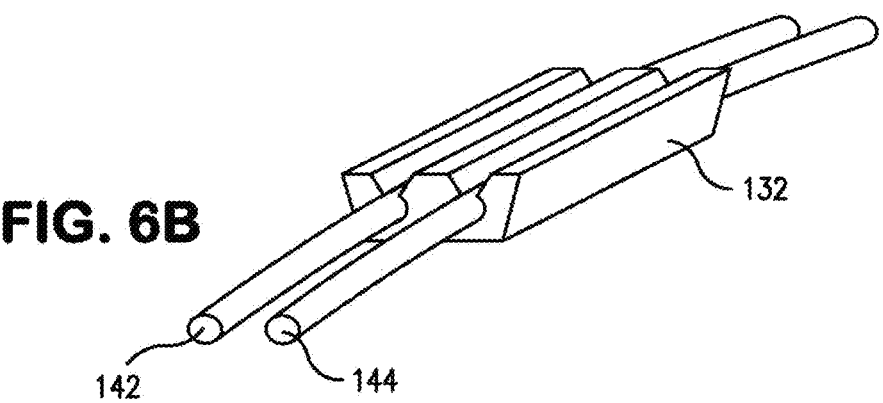
FIG. 6B is a perspective view of a polymer sheath (or sleeve) usable with the present invention, with line segments affixed thereto.
Figure 6C:
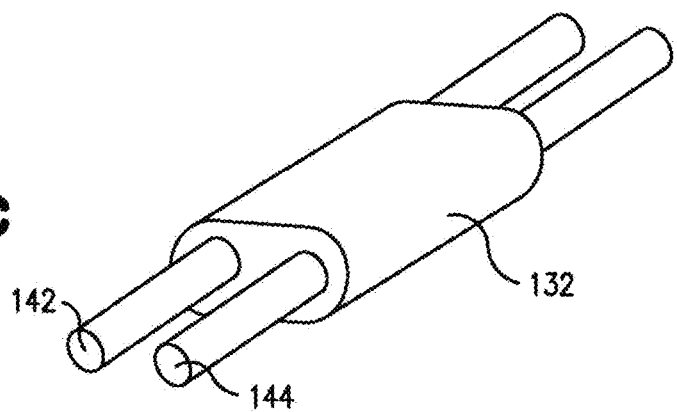
FIG. 6C is a perspective view of a melted polymer sheath (or sleeve) joining the line segments together.

Turning next to FIGS. 6A-6C, there is shown a further exemplary embodiment of the present invention using a pre-formed polymer sheath (or sleeve) 132. Again, the pre-formed polymer sheath (or sleeve) 132 has a pair of channels 134, 136 formed therein for receipt and securement of line segments 142, 144, with the channels 134, 136 being cylindrical in shape with V-shaped entries 138, 140 so that line segments 142, 144 can be simply snapped into the channels 134, 136, separate from each other and retained therein.

Thus, in FIG. 6B, the line segments 142 and 144 have been snapped into position within the channels 134, 136 where they are retained therein. Again, there is an application of heat (not shown) that may be supplied by a clamshell encasement of the type shown in FIG. 3A-3C, 4A-4D, or 5A-5D, or by other heating means, and the pre-formed polymer sheath (or sleeve) 132 melted so as to surround the line segments 142, 144 and join them together.

Figure 7A:
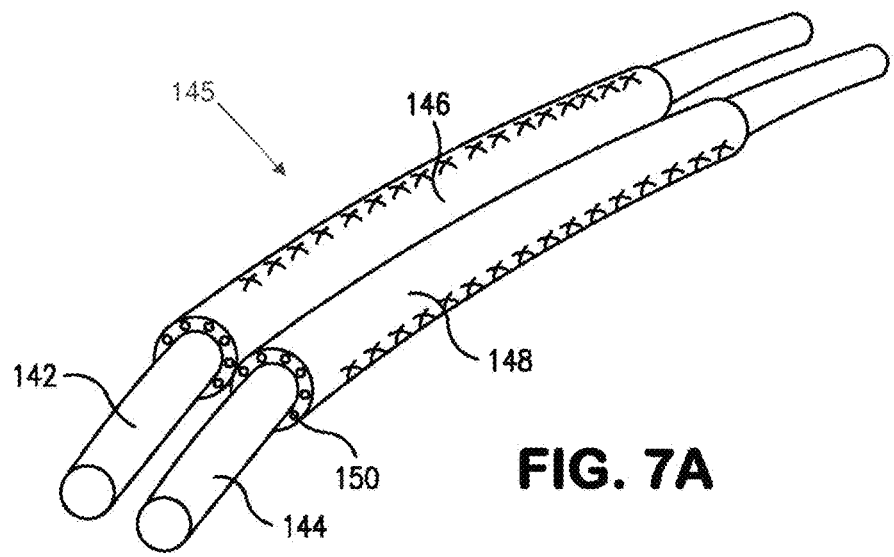
FIG. 7A is a perspective view of a further exemplary embodiment of the present invention.
Figure 7B:
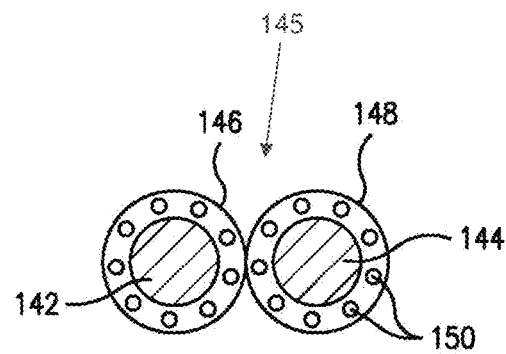
FIG. 7B is a cross-sectional view of the embodiment of FIG. 7A, illustrating line segments in position to be joined together.
Figure 7C:
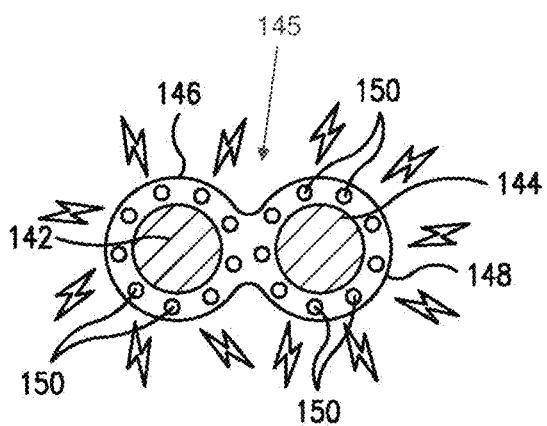
FIG. 7C is a cross-sectional view of the embodiment of FIG. 7A, illustrating the completion of joining the line segments together.

Looking next at FIGS. 7A-7C, there is shown a perspective view and cross-sectional views of a further exemplary embodiment of the present invention. In FIG. 7A, there can be seen a pair of line segments 142, 144 that are intended to be joined together. In this embodiment of the invention, the line segments 142, 144 are encircled by a pre-formed meltable polymer construct 145 that comprises at least two pre-formed polymer sheaths (or sleeves) 146, 148, such that the polymer melts at a temperature that is lower than the melting temperature of the line segments 142, 144. The pre-formed polymer sheaths (or sleeves) 146, 148 can have reinforcing braids 150 within the material of the pre-formed polymer sheaths (or sleeves) 146, 148 so as to strengthen the material (and hence the final construct).

As seen in FIG. 7B, the braided material of the pre-formed polymer sheaths (or sleeves) 146, 148 encircles the line segments 142, 144 as they extend alongside each other awaiting the heating step. In FIG. 7C, the polymer of the pre-formed sheaths (or sleeves) 146 148 have been heated so that the meltable or flowable material of the pre-formed polymer sheaths (or sleeves) 146, 148 has melted and created a seal surrounding the line segments 142, 144, with the braids 150 embedded therein, thereby joining the line segments 142, 144 together in a junction with enhanced strength.

Thus it will be seen that with the embodiments of FIGS. 5A-5D, 6A-6C and 7A-7C, a pre-formed adhesive or flowable polymer (or other flowable material) sleeve is provided, the line segments which are to be joined are positioned in the pre-formed adhesive or flowable polymer (or other flowable material) sleeve, and then the pre-formed adhesive or flowable polymer (or other flowable material) sleeve is transformed (e.g., by the application of heat) so some or all of the pre-formed adhesive or flowable polymer (or other flowable material) sleeve becomes flowable, whereby to cause the adhesive or flowable polymer (or other flowable material) to form an encasing structure about the line segments and thereby lock them in position relative to one another.

Figure 8:
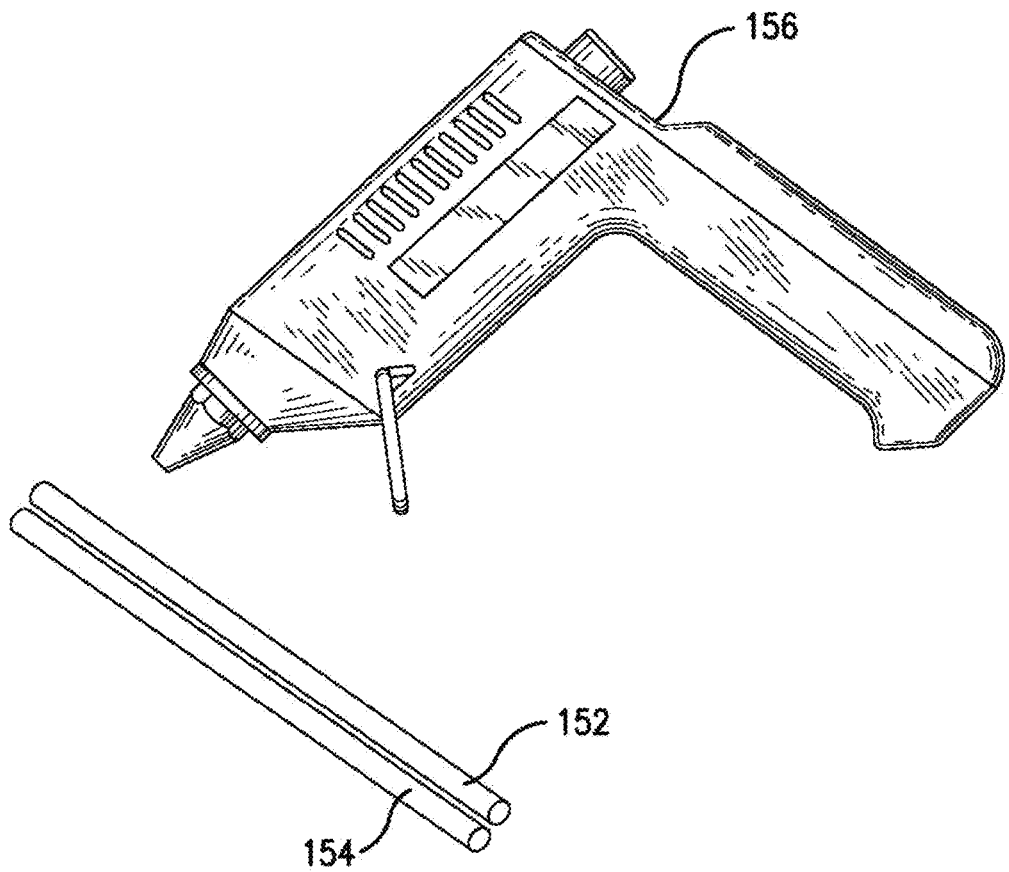
FIG. 8 is a side view of another exemplary embodiment of the present invention, illustrating the use of a glue gun to join two line segments together.
Figure 9A:
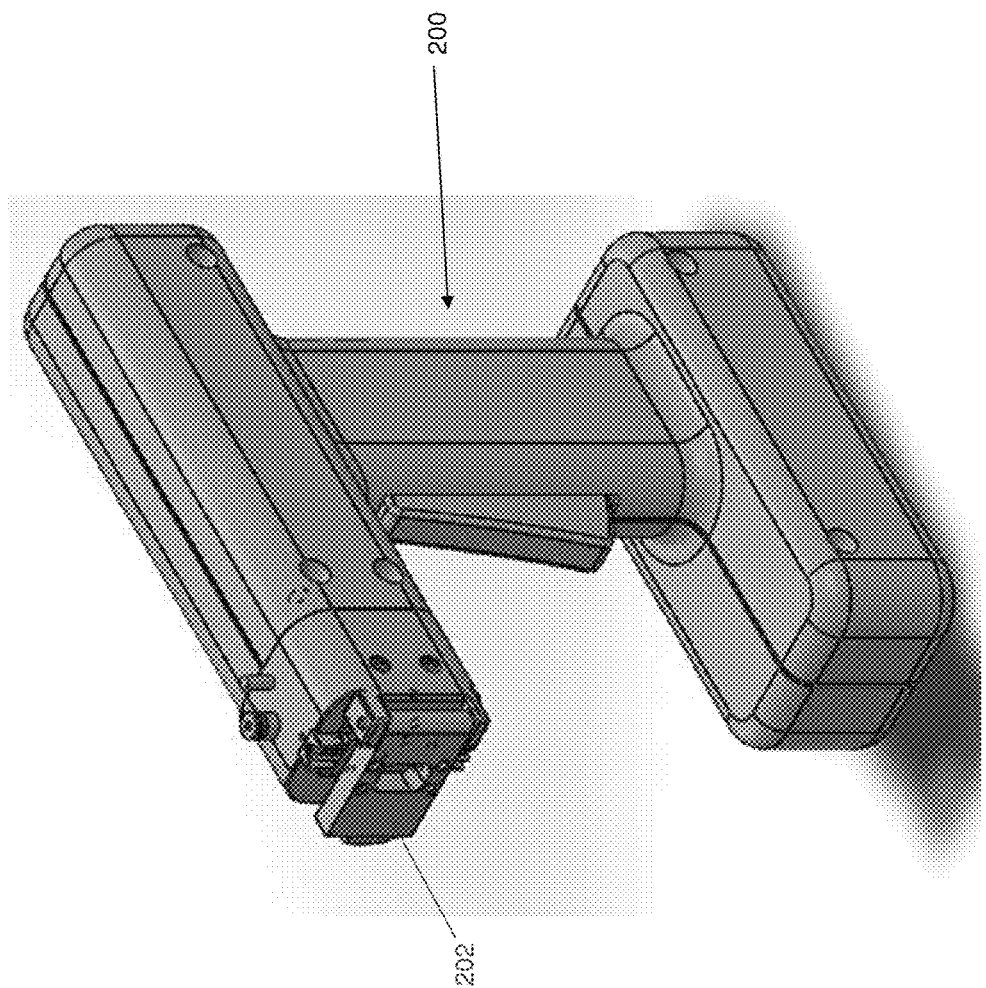
Figure 9B:
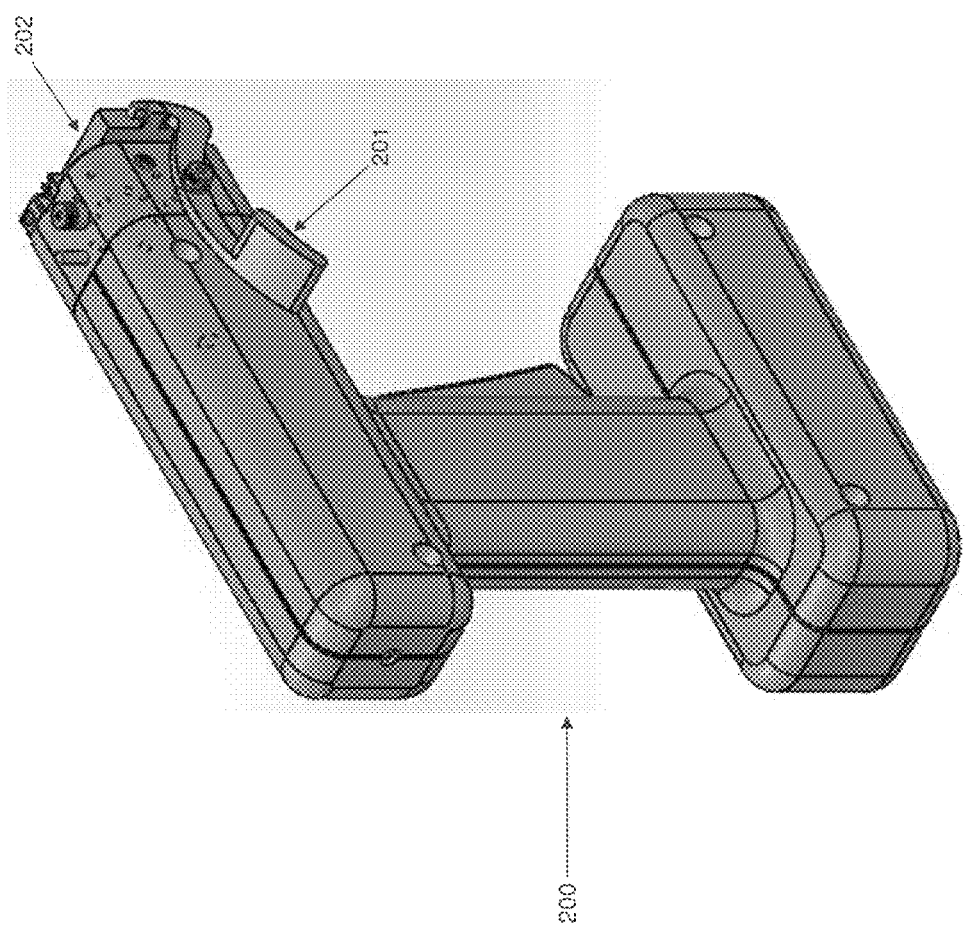
Figure 9C:
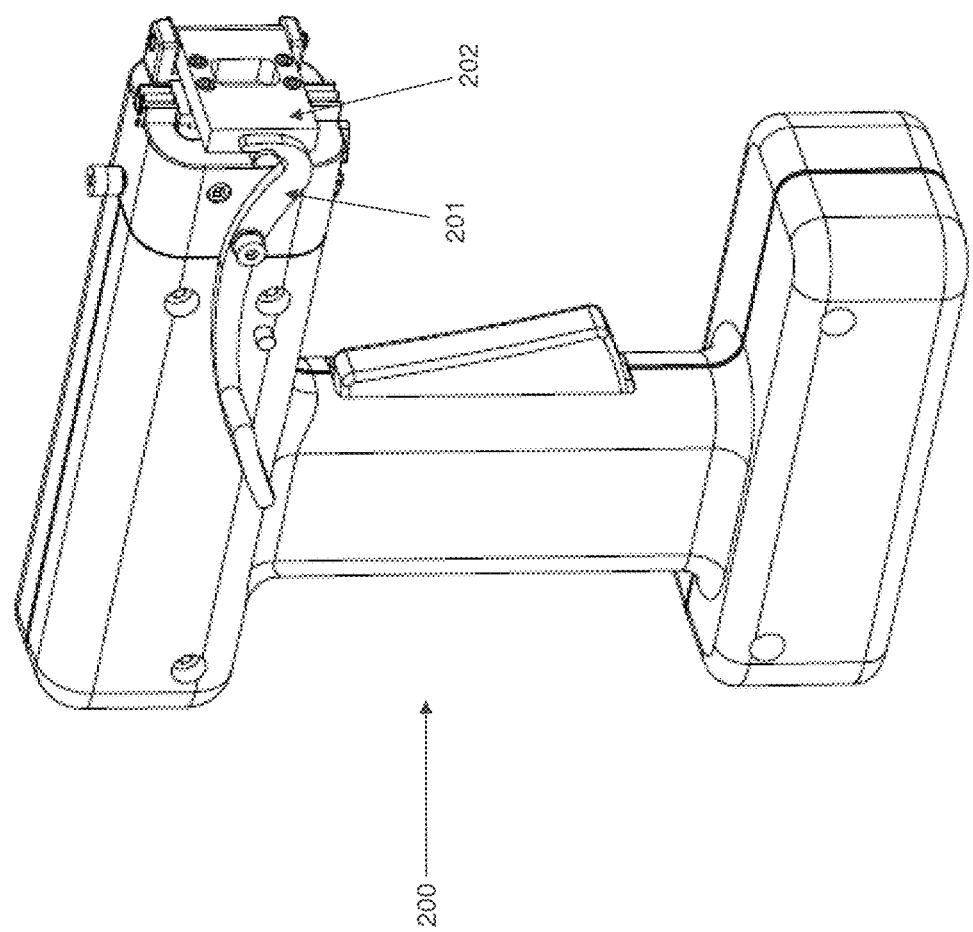

Turning next to FIG. 8, there is shown a side view illustrating a still further embodiment of the present invention wherein two line segments 152, 154 are being joined together with the use of a hand-held device 156 that melts an adhesive or flowable polymer (or other flowable material). Again, the particular adhesive or flowable polymer (or other flowable material) used in the hand-held device 156 is selected so as to have a melting temperature that is lower than the melting temperature of the line segments 152, 154, such that the adhesive or flowable polymer (or other flowable material) can be laid along the junction of the line segments 152, 154 so as to join the line segments 152, 154 together.

It should also be appreciated that with this embodiment of the invention, the line segments 152, 154 may also be aligned in a pre-formed meltable or flowable polymer sheath (or sleeve), e.g., as illustrated in FIG. 6A, and a hand-held heater, similar to the device of FIG. 8, can be used to heat the polymer and melt the polymer so as to mold the sheath (or sleeve) about the line segments and thereby join the line segments together.

FIGS. 9A-9D show an alternative hand-held device 200 that molds a polymer sheath (or sleeve) fastener about a plurality of line segments so as to join those line segments together.

Figure 10B:
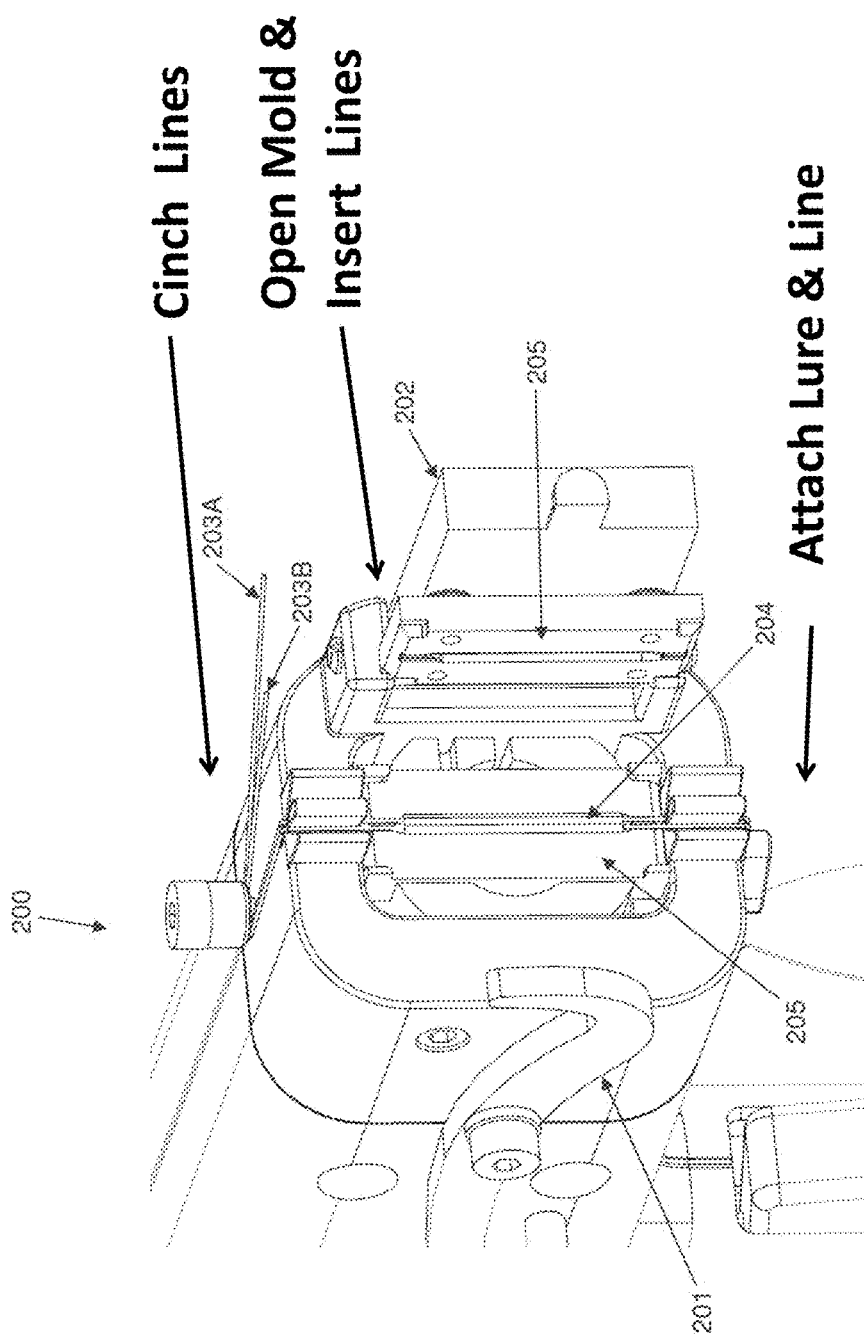
Figure 10C:
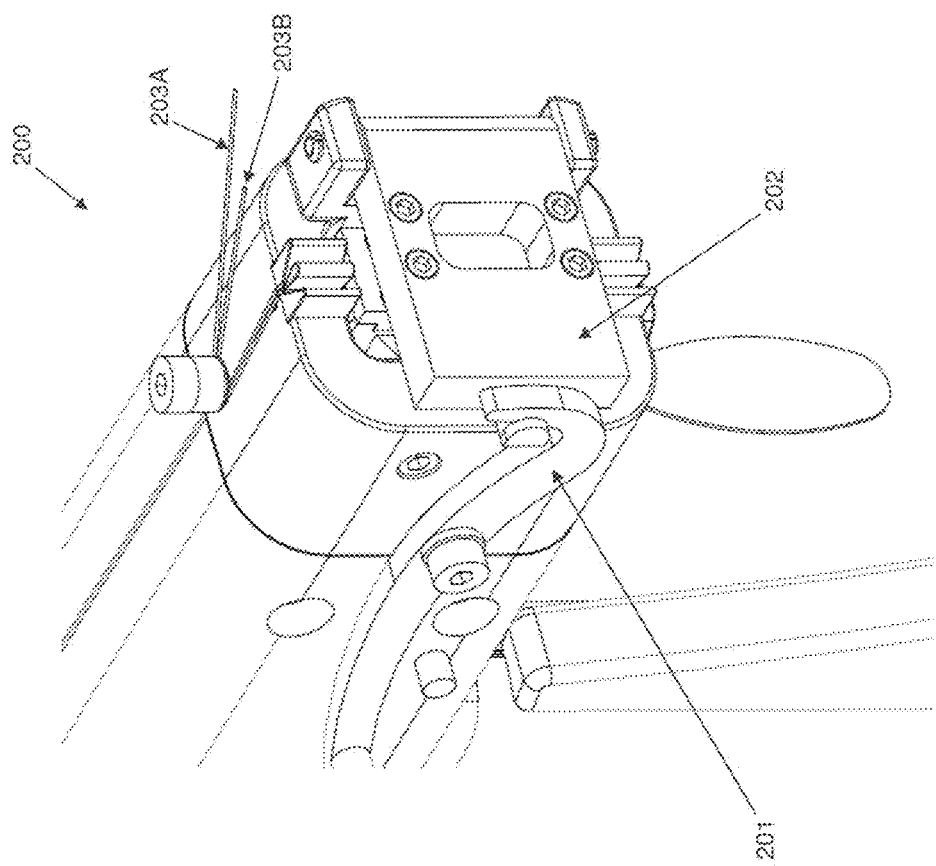
Figure 10F:
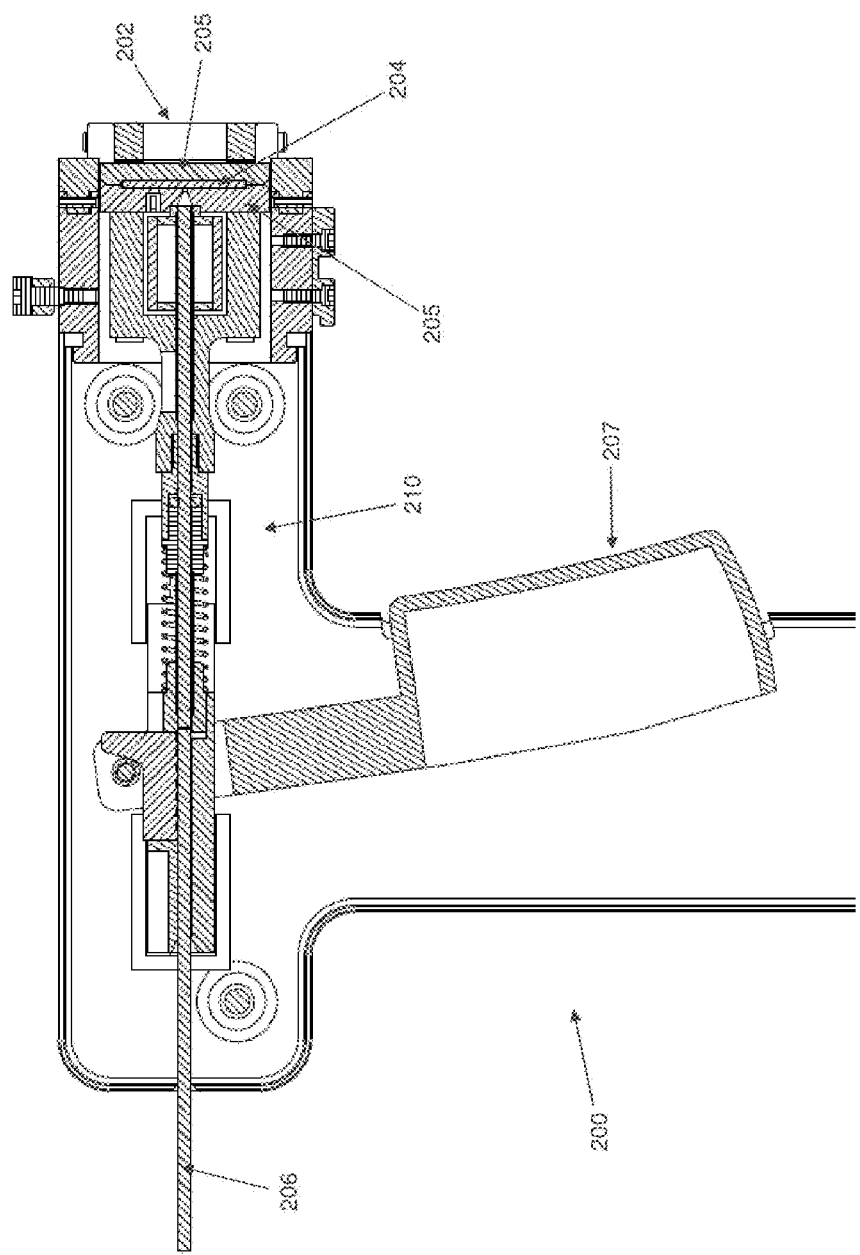

Looking now at FIGS. 9A-9D, and also 10A-10F, with hand-held device 200, a latch 201 is released so as to open a mold door 202 (FIG. 10A), line segments 203A, 203B are extended across the cavity 204 of a mold 205 (FIG. 10B), and then mold door 202 is closed (FIG. 10C). Then, as seen in FIGS. 10D-10F, a stick 206 of flowable polymer (or other flowable material) is loaded into hand-held device 200 and then trigger 207 is depressed, causing injection assembly 210 to inject or administer the flowable polymer into mold cavity 204, whereby to create, in situ, the polymer sheath (or sleeve) that encapsulates the line segments. Note that hand-held device 200 is configured so as to hold the line segments 203A, 203B spaced apart from one another so as to increase the bond strength between the polymer sheath (or sleeve) and the line segments. This bonding process and design does not impair the integrity of the line segments because it avoids crimping, compressing, deforming, or unwantedly abrading of the line segments, which has been shown to reduce the tensile strength of the joined line.

FIG. 11 shows details of the mold 205 which defines mold cavity 204 (and hence the configuration of the molded polymer sheath or sleeve).

Figure 12A:
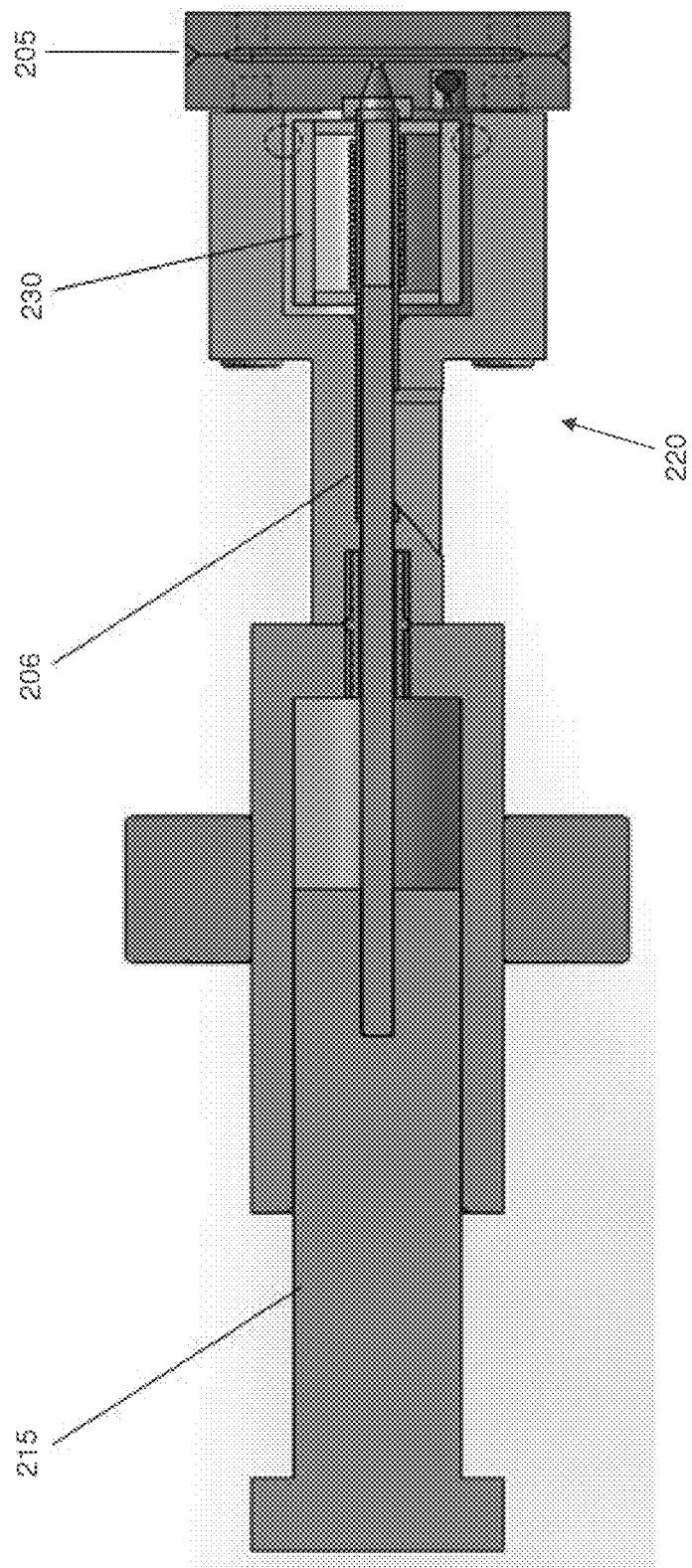
FIGS. 12A and 12B are cross-sectional views of the polymer plunging assembly of the device shown in FIGS. 9A-9D and 10A-10F, highlighting the plunger, injector, heater and mold components in accordance with an embodiment of the present invention.
Figure 12B:
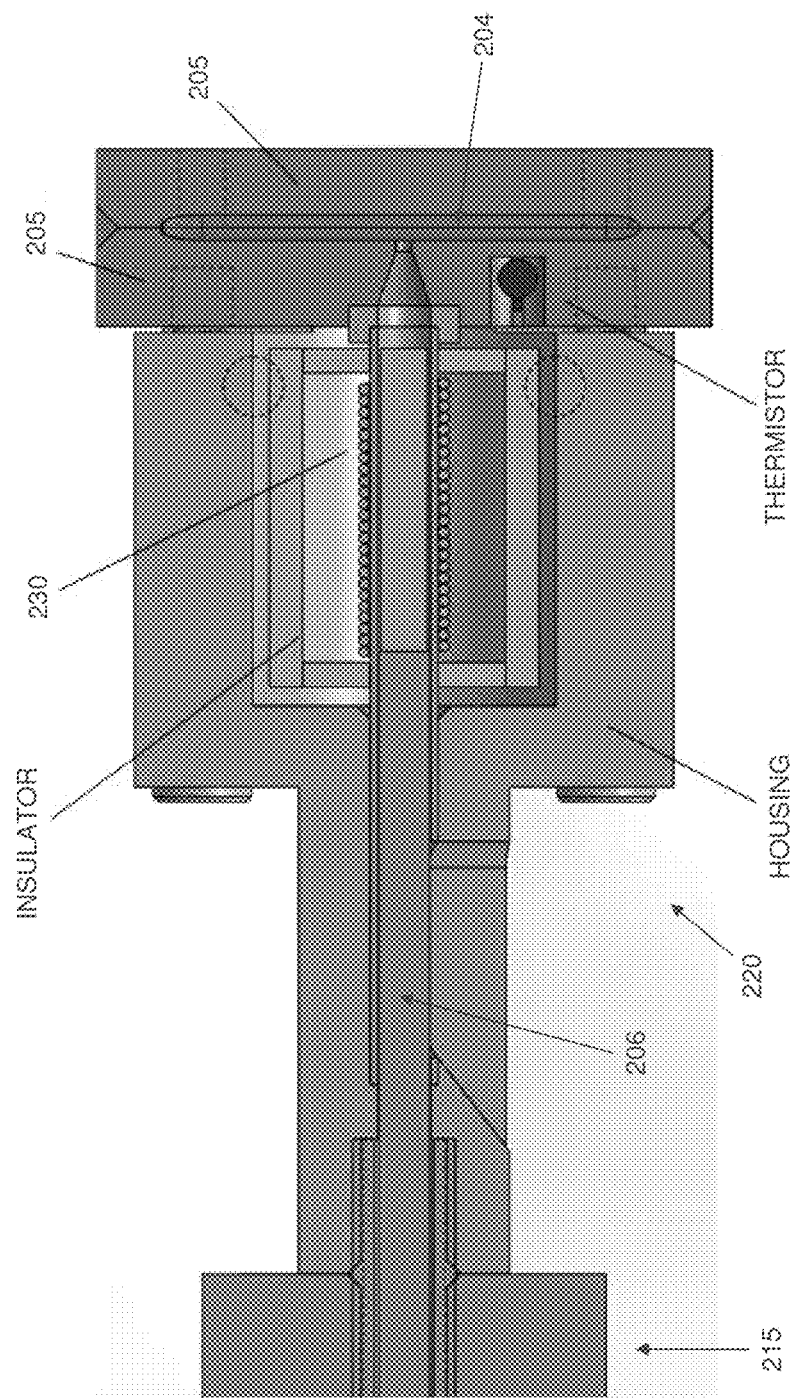

The injection assembly 210 of hand-held device 200 is shown in great detail in FIGS. 12A and 12B. Injection assembly 210 generally comprises a plunger mechanism 215 and an injector mechanism 220. The plunger mechanism 215 is used to advance the stick 206 of the flowable polymer material through the injector mechanism 220 such that a heater 230 in the injector mechanism is able to melt the flowable polymer so it can be molded in cavity 204 of mold 205, thereby encapsulating the line segments that are supported by mold 205 in a spaced orientation so as to create a resulting polymer sheath (or sleeve) that secures the line segments together.

Figure 13:
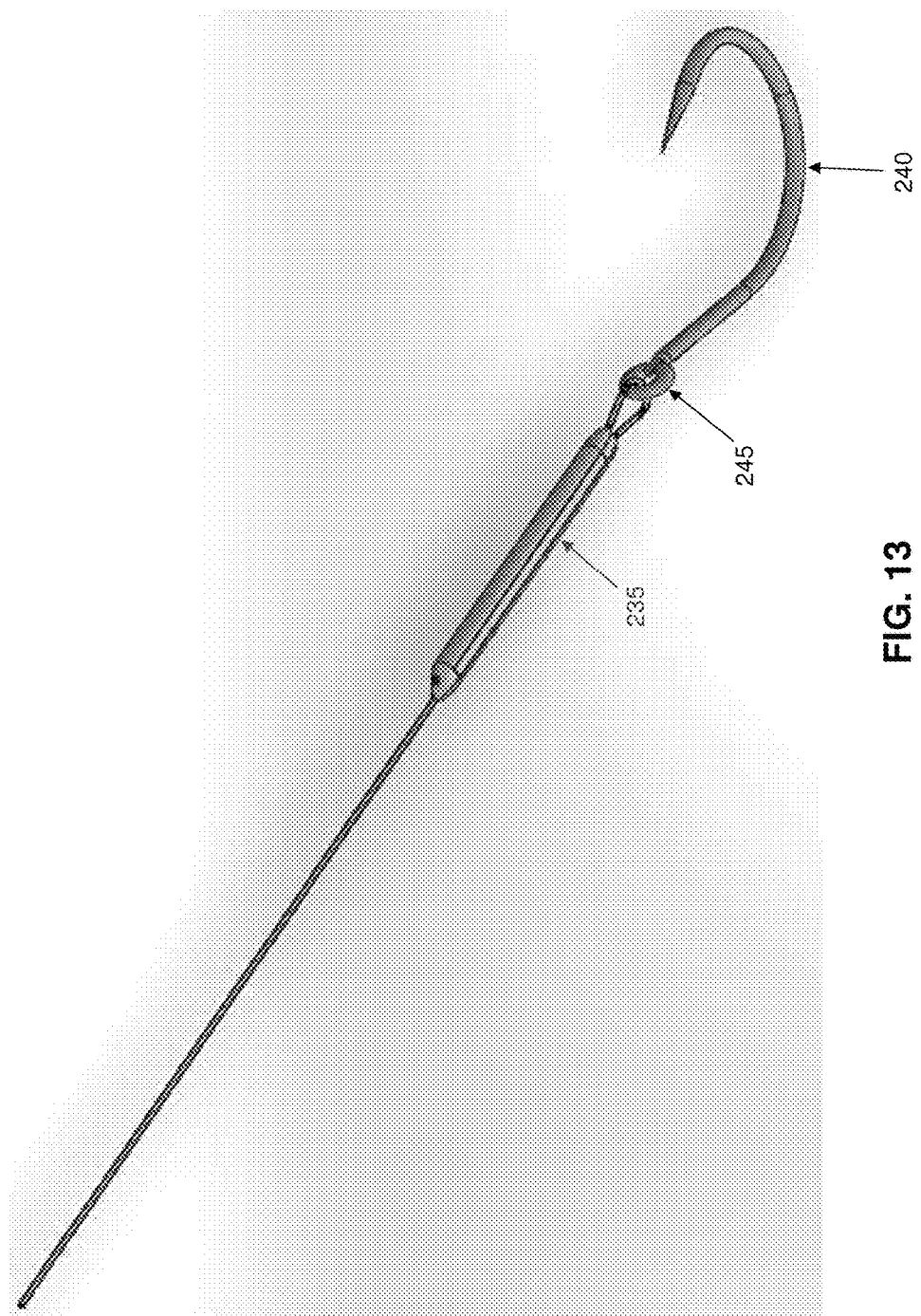
FIG. 13 is a perspective view showing the polymer sheath used to secure segments of line so as to attach a fishing hook in accordance with the device embodiment of FIGS. 9A-9D and 10A-10F.
Figure 15A:
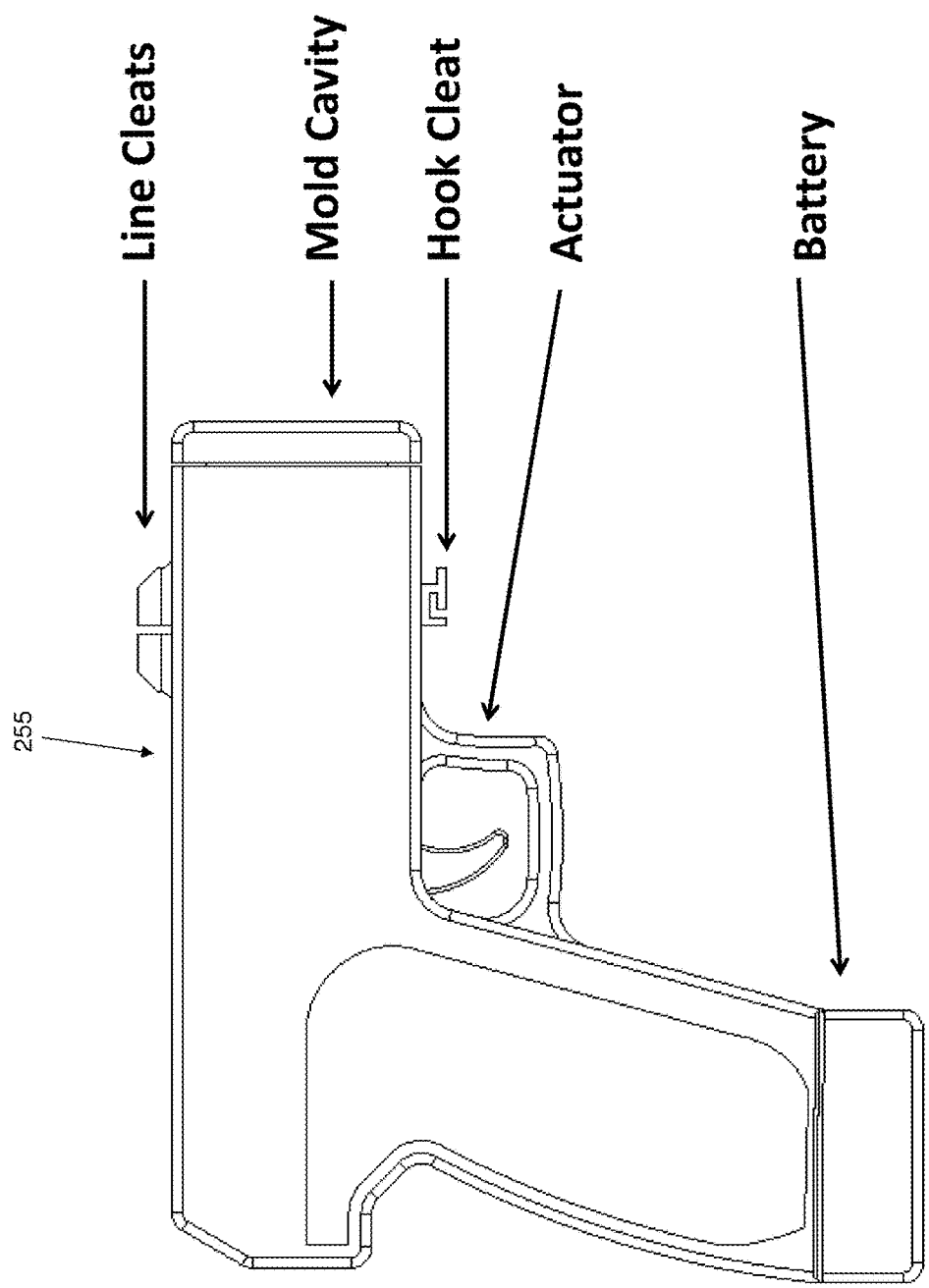
Figure 15E:
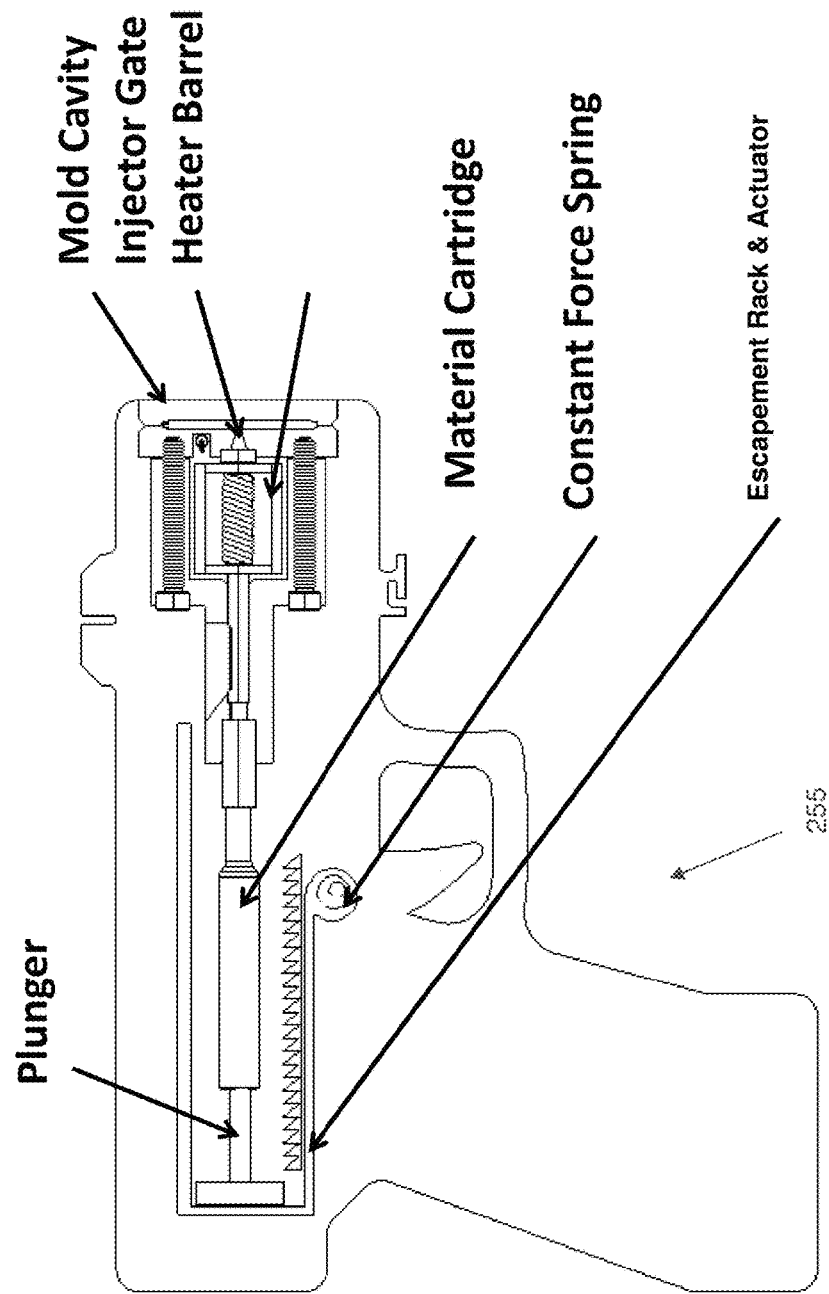

FIG. 13 shows a polymer sheath (or sleeve) 235 created by the hand-held device 200. In FIG. 13, the polymer sheath (or sleeve) 235 is shown being used to bond line segments that secure a fishing hook 240 (or other component), with the line being looped through an eyelet 245 in the hook (or other component).

The polymer sheath/sleeve 235 may be fabricated with an elongated orientation as shown in FIGS. 14A through 14I. In one preferred form of the invention, the polymer sheath (or sleeve) 235 holds the line segments in parallel, spaced-apart relation. In one preferred form of the invention, polymer sheath (or sleeve) 235 is beveled, e.g., as shown at 250, so as to facilitate passing polymer sheath (or sleeve) 205 through a constrained opening such as the eye of a fishing rod, and to minimize abrasion with line segments or other components, etc.

Alternatively, as described previously, the line segments may be secured in the polymer sheath (or sleeve) with a non-parallel orientation, and/or multiple segments from a single line, or multiple lines, may be secured in the polymer sheath (or sleeve). In addition, the polymer sheath (or sleeve) may be used to secure a hook or other component directly to a line segment without having to loop the line. The polymer sheath (or sleeve) may also incorporate any other shape defined by the mold cavity 204 through which the line segments (and hook or other component, for embodiments in which a portion of the hook or other component are to be encapsulated) can be inserted. This geometry may consist of a T-shape (to position hooks orthogonal to the line segments) or any other shape to support the needs for mounting and configuring multiple lines in a non-linear orientation.

Figure 16C:
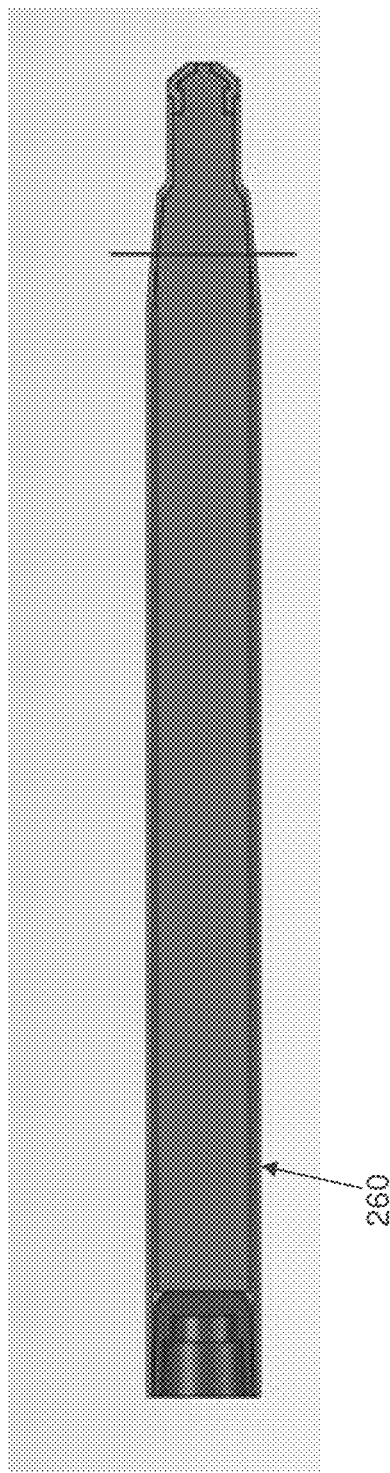

An alternative hand-held device 255, shown in FIGS. 15A to 15E and generally similar to the aforementioned hand-held device 200 except as otherwise stated, incorporates a polymer cartridge system for injecting polymer sheath material into a mold so as to secure line segments. A replaceable cartridge 260 for releasably containing the polymer, and for insertion into the hand-held device 255, is shown in FIGS. 16A-16C. The replaceable cartridge 260 can house the raw polymer material in the form of a fluid, powder, pellet, or solid. A plunger, compressible roller, or other mechanism may be used by hand-held device 255 to expel the raw polymer material out of the cartridge, through the injector mechanism 220, and into the mold cavity 204 of mold 205 to mold the polymer sheath (or sleeve) around the oriented line segments. The heater 230 may be used to melt the polymer raw material so as to facilitate injecting the polymer into the mold cavity, especially when the polymer is maintained as a powder, pellet or solid form in the cartridge 260. Alternatively, the cartridge 260 may incorporate an internal spring mechanism, or be pressurized, to enable the raw polymer material to be ejected from the cartridge 260 without requiring an actuating mechanism associated with the hand-held device 255. In those hand-held embodiments, the heating mechanism melts the raw polymer material to enable flowing the polymer material into the mold cavity 204 where molding around the line segments is achieved. Whether it is these or other cartridge injection concepts, the key is to provide a replaceable cartridge that can easily and cleanly inject the raw polymer material into the mold cavity 204, and to allow the user to quickly switch cartridges, whereby to change the material type, viscosity, color, additive, or other feature, so that the polymer sheath (or sleeve) can be customized to the application.

Just as the cartridge 260 may be replaceable, the mold 205 (and hence mold cavity 204) may also be replaceable in order to accommodate different line segment sizes, different numbers of line segments, the orientation of line segments in parallel or non-parallel orientations, or encapsulation of hooks or other components within the polymer sheath (or sleeve), as described above.

Figure 17:
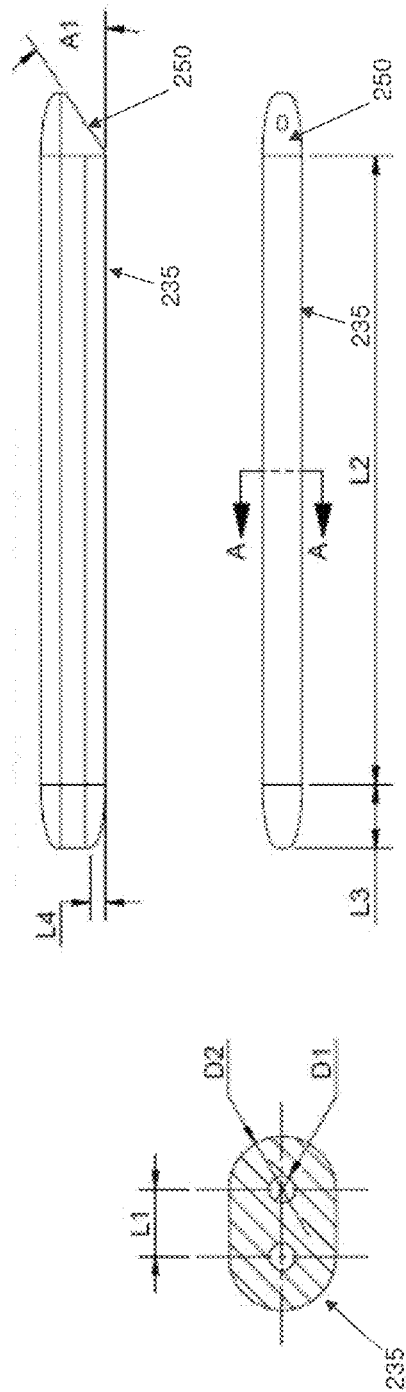
FIG. 17 is a polymer sheath (or sleeve) embodiment illustrating a preferred relationship between the polymer sheath (or sleeve) dimensions and the secured line dimensions so as to optimize tensile strength using the devices described above in accordance with an embodiment of the present invention.

FIG. 17 shows preferred relationships between the dimensions of the polymer sheath (or sleeve) 235 and the secured line segments so as to optimize the bond strength while maintaining the integrity of the line segments. In one preferred form of the invention, the individual line segments are separated such that the spacing (L1) is at least 0.5 times, and preferably 2.5 times, the diameter (D1) of the smallest diameter line segment so as to ensure that the mold encapsulates the entire surface of the line segment and avoids compressing individual line segments. Optimizing tensile strength is obtained when the wall thickness of the polymer sheath (or sleeve) 235 is designed such that the outer diameter, or width for non-circular cross-sections, is at least 2 times, and preferably 4 times, the diameter of the line segment which is being encapsulated.

FIG. 18 is a graph showing performance characteristics for the present invention.

Figure 19:
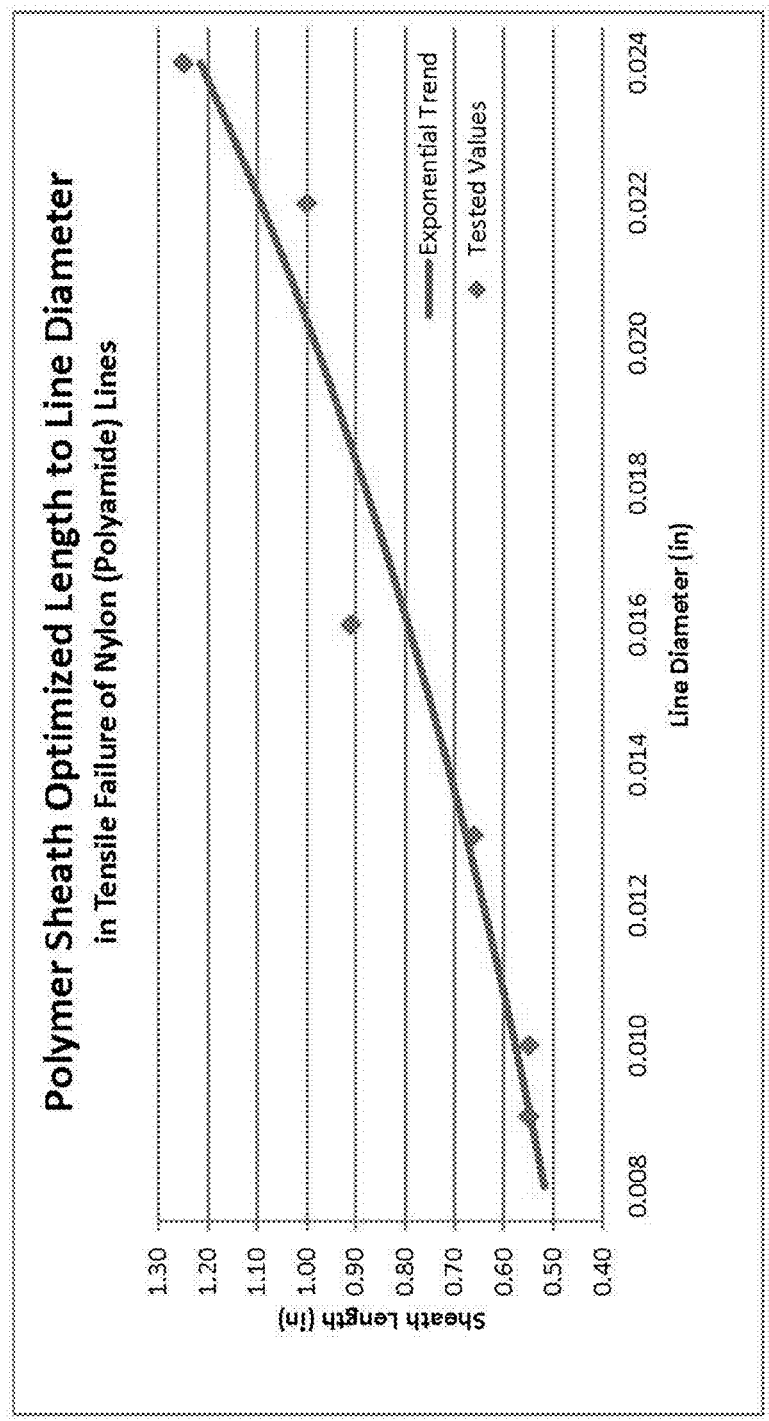
FIG. 19 is a graph showing the tensile strength of joined lines as a plot of sleeve length vs. line diameter.

FIG. 19 is a graph showing the tensile strength of joined lines as a plot of sleeve length vs. line diameter.

Figure 20:
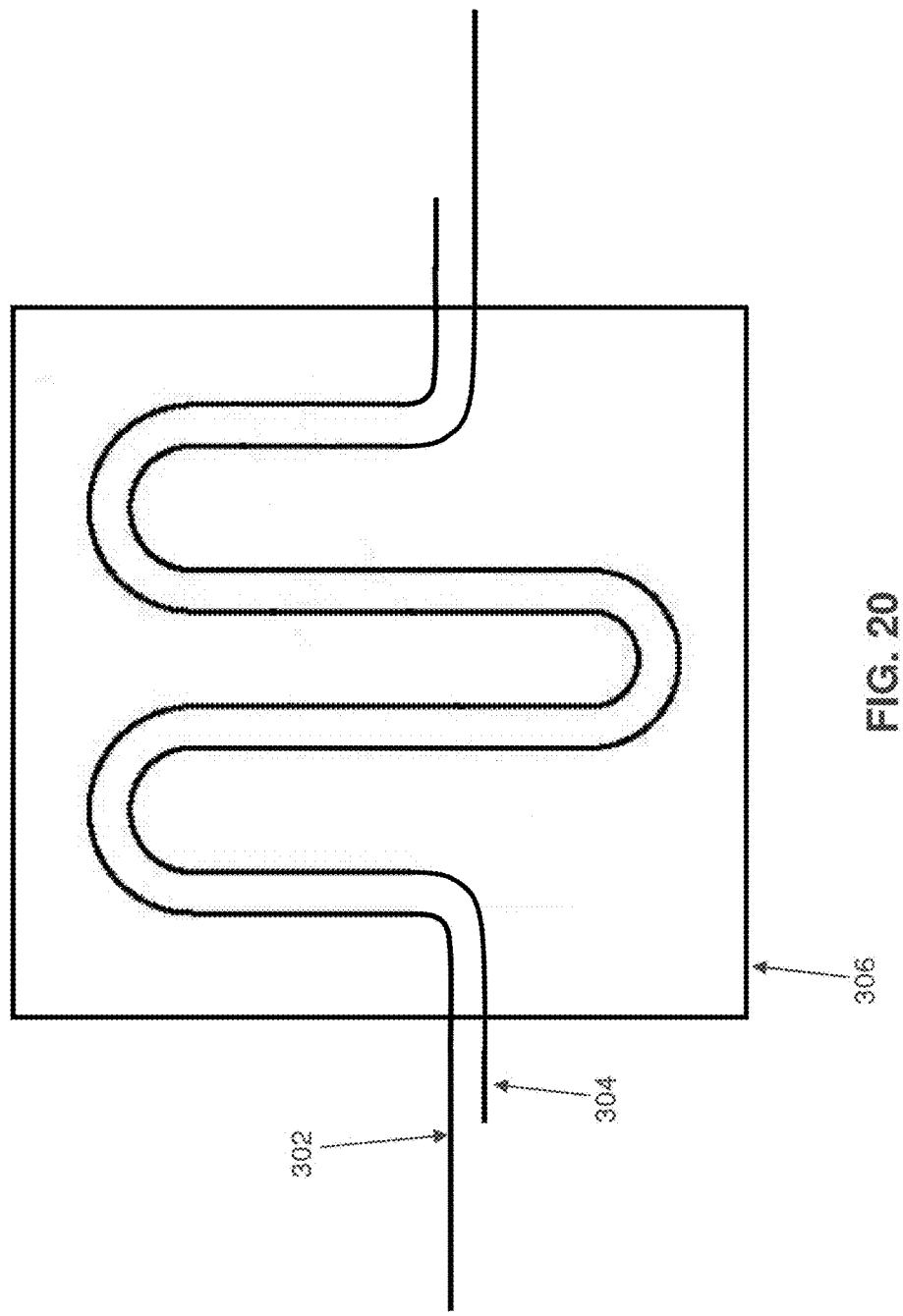
FIG. 20 is a schematic view showing another approach for connecting a plurality of line segments in accordance with the present invention.

In the foregoing discussion, it was noted that the line segments may extend in parallel or non-parallel, spaced relation within the molded sheath (or sleeve) construct. In this respect it should be appreciated that various strategies may be employed to increase the surface area of the line segments engaged by the molded sheath (or sleeve), and/or to adjust the pathway of the line segments engaged by the molded sheath (or sleeve), whereby to increase the strength of the bond. See, for example, FIG. 20, where the line segments 302, 304 extend in a serpentine manner through the molded sheath (or sleeve) construct 306.

Figure 21:
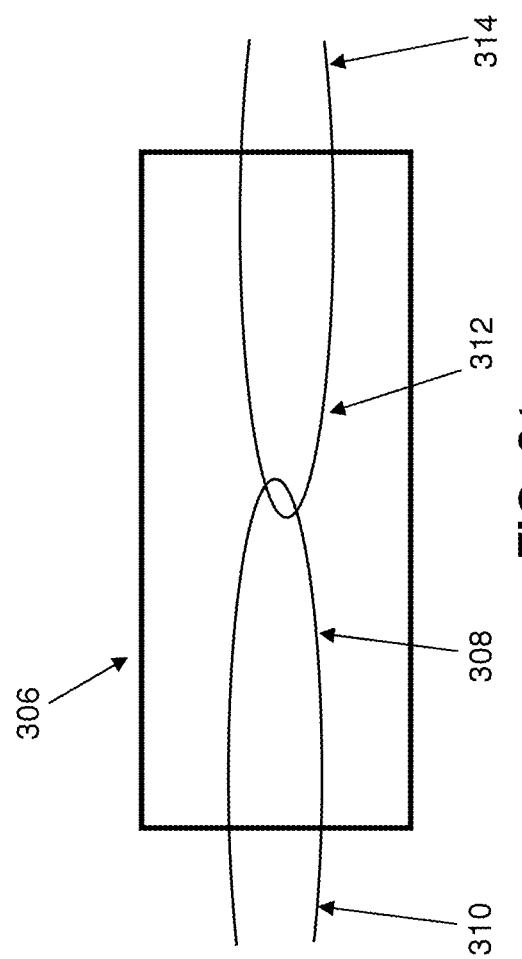
FIG. 21 is a schematic view showing still another approach for connecting a plurality of line segments in accordance with the present invention.
Figure 22:
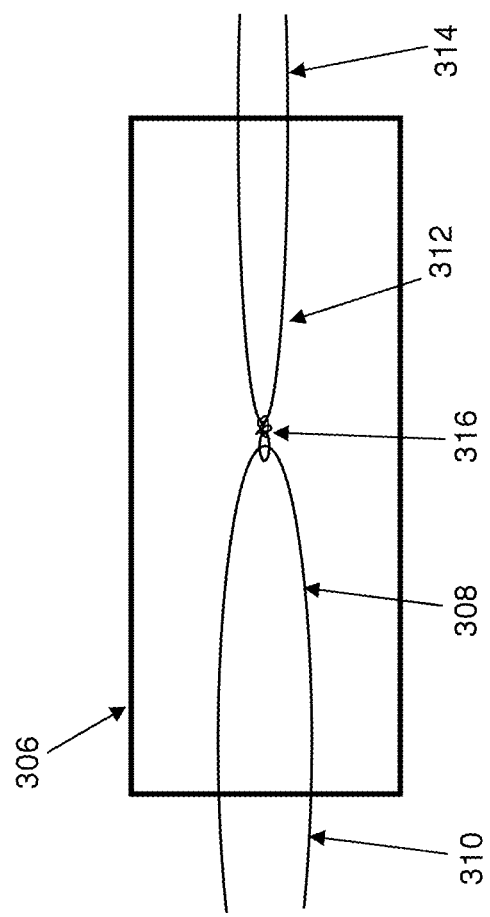
FIG. 22 is a schematic view showing yet another approach for connecting a plurality of line segments in accordance with the present invention.

It is also possible to have the line segments contact one another within the molded sheath. See, for example, FIG. 21, which shows a loop 308 of a line 310 and a loop 312 of a line 314, where loop 308 and loop 312 are passed through one another. This approach can provide a superior bond, particularly where one line is braided line and the other line is monofilament line. See also, for example, FIG. 22, where line 314 is knotted (e.g., at 316) within the molded sheath. Again, this can provide a superior bond, particularly where one line is braided line and the other line is monofilament line. Still other configurations for the line segments will be appreciated by those skilled in the art in view of the present disclosure.

In addition to the embodiments discussed above, the devices of the present invention may attach line segments for applications other than fishing. In particular, any application in which two segments of line, thread, yarn, suture, wire, or other flexible elongated material are bonded together may benefit from the embodiments of the present invention, which secure at least two line segments together such that they are spaced apart to improve bond strength and profile of the bond while preserving the physical integrity of the raw line material.

Thus it will be seen that, in one preferred form of the invention, the invention comprises the provision and use of a molded fastener, formed at least in part out of a flowable material, to secure two or more line segments in position relative to one another. In use, the line segments are positioned with a desired orientation (e.g., in a parallel or non-parallel, spaced relationship), the flowable material is flowed about the line segments so as to engulf the line segments, and then the flowable material is set so as to form an encasing structure about the line segments, whereby to lock the line segments in position relative to one another.

In one form of the invention, the molded fastener is formed in situ, e.g., the line segments are positioned in a mold with the desired orientation, the flowable material is flowed into the mold and about the line segments, and then the flowable material is set so as to form the encasing structure about the line segments, whereby to lock the line segments in position relative to one another.

In another form of the invention, the molded faster is at least partially pre-formed, and then the final configuration of the molded fastener is effected in situ, e.g., the line segments are positioned in the at least partially pre-formed molded fastener, the flowable material is flowed about the line segments, and then the flowable material is set so as to form the encasing structure about the line segments, whereby to lock the line segments in position relative to one another.

The flowable material may comprise any material capable of performing the desired function. In one form of the invention, the flowable material forms a mechanical bond with the line segments when set. In another form of the invention, the flowable material forms a chemical bond with the line segments when set. And in another form of the invention, the flowable material forms both mechanical and chemical bonds with the line segments when set. The flowable material may comprise an adhesive (including a hot melt adhesive) and/or a flowable polymer and/or any other appropriate material, and flowing/setting of the flowable material may be effected according to the nature of the flowable material, e.g., heating/cooling, the absence or presence of UV light, the absence or presence of a reactant, etc.

Modifications of the Preferred Embodiments

While the present invention has been set forth in terms of a specific embodiment or embodiments, it will be understood that the method and apparatus for joining lines together herein disclosed may be modified or altered by those skilled in the art to other configurations. Accordingly, the invention is to be broadly construed and limited only by the scope and spirit of the claims appended hereto.

What is claimed is:

1. A method for securing at least two line segments in position relative to one another, the method comprising:
positioning the at least two line segments in a chamber in a hand-held tool with a desired orientation, wherein the at least two line segments are positioned in the chamber in a spaced, non-contacting relationship to one another within the hand-held tool, and further wherein the at least two line segments are cinched around a first cleat offset laterally from one end of the chamber and a second cleat offset laterally from an opposite end of the chamber so as to maintain the at least two line segments in position relative to one another;
using the hand-held tool to flow flowable material around and between the at least two line segments so as to engulf the at least two line segments with a singular mass, wherein the flowable material has a melting temperature which is lower than a melting temperature of the at least two line segments so that the flowable material melts and flows around and between the at least two line segments without causing the at least two line segments to melt;
setting the flowable material in the hand-held tool so as to form a molded fastener which acts as an encasing structure around and between the at least two line segments, whereby to lock the at least two line segments in a spaced position relative to one another;
releasing the at least two line segments from the first cleat and the second cleat; and
removing the at least two line segments and the molded fastener from the chamber.

2. A method according to claim 1 wherein the at least two line segments are secured in position relative to one another without causing any damage to the at least two line segments.

3. A method according to claim 1 wherein the at least two line segments are secured in position relative to one another so that the molded fastener between the at least two line segments is at least as strong as the strength of the weakest of the at least two line segments.

4. A method according to claim 1 wherein the flowable material forms a mechanical bond with the at least two line segments within the molded fastener.

5. A method according to claim 1 wherein the flowable material forms a chemical bond with the at least two line segments within the molded fastener.

6. A method according to claim 1 wherein the flowable material forms both mechanical and chemical bonds with the at least two line segments within the molded fastener.

7. A method according to claim 1 wherein the at least two line segments are positioned in a parallel spaced relationship within the molded fastener.

8. A method according to claim 1 wherein the at least two line segments are positioned in a non-parallel spaced relationship within the molded fastener.

9. A method according to claim 1 wherein the molded fastener is formed completely in situ.

10. A method according to claim 1 wherein the molded fastener is at least partially pre-formed, and further wherein the final configuration of the molded fastener is effected in situ.

11. A method according to claim 1 wherein the flowable material comprises an adhesive.

12. A method according to claim 1 wherein the flowable material comprises a hot melt adhesive.

13. A method according to claim 1 wherein the flowable material comprises a flowable polymer.

14. A method according to claim 1 wherein the flowable material is set by a change in temperature.

15. A method according to claim 1 wherein the flowable material is set by UV light.

16. A method according to claim 1 wherein the flowable material is set by a chemical reaction.

17. A method according to claim 1 wherein the molded fastener is elongated.

18. A method according to claim 1 wherein the molded fastener is beveled at one end.

19. A method for joining lines, the method comprising the steps of:
- positioning the lines in a side by side relationship in a closed chamber, wherein the lines are positioned in a spaced, non-contacting relationship to one another in the closed chamber, and further wherein the lines are cinched around a first cleat offset laterally from one end of the chamber and a second cleat offset laterally from an opposite end of the chamber so as to maintain the lines in position relative to one another;
- introducing an adhesive material into the closed chamber around and between the lines so as to engulf the lines with a singular mass, wherein the adhesive material has a melting temperature which is lower than a melting temperature of the lines so that the adhesive material melts and flows around and between the lines without causing the lines to melt;
- allowing the adhesive material to encase the lines and join the lines together in a spaced relationship;
- releasing the lines from the first cleat and the second cleat; and
- removing the lines from the closed chamber.

* * * * *